United States Patent
Olliff et al.

(10) Patent No.: US 11,542,788 B2
(45) Date of Patent: Jan. 3, 2023

(54) DRILLING OUT FRAC PLUGS

(71) Applicant: Brigade Energy Services, Denver, CO (US)

(72) Inventors: Gary Christopher Olliff, Weston Lakes, TX (US); Michael Adrian Contreras, Houston, TX (US)

(73) Assignee: Brigade Energy Services, Denver, CO (US)

( * ) Notice: Subject to any disclaimer, the term of this patent is extended or adjusted under 35 U.S.C. 154(b) by 311 days.

(21) Appl. No.: 16/805,541

(22) Filed: Feb. 28, 2020

(65) Prior Publication Data
US 2020/0277841 A1 Sep. 3, 2020

Related U.S. Application Data

(60) Provisional application No. 62/812,920, filed on Mar. 1, 2019.

(51) Int. Cl.
*E21B 41/00* (2006.01)
*E21B 29/00* (2006.01)

(52) U.S. Cl.
CPC ........ *E21B 41/0092* (2013.01); *E21B 29/002* (2013.01)

(58) Field of Classification Search
CPC ......... E21B 33/16; E21B 29/00; E21B 29/002
See application file for complete search history.

(56) References Cited

U.S. PATENT DOCUMENTS

2009/0182694 A1    7/2009  Boulatsel et al.
2016/0115776 A1*   4/2016  Haci ................... E21B 43/261
                                                    175/48

FOREIGN PATENT DOCUMENTS

CA        2794094 A1      4/2014
WO     2013/162529 A2    10/2013
WO    WO-2014066981 A  *  5/2014  ............ E21B 44/00

OTHER PUBLICATIONS

PCT/US2020/020515 Written Opinion Search Report dated May 18, 2020, 11 pages.

* cited by examiner

*Primary Examiner* — Abby J Flynn
*Assistant Examiner* — Yanick A Akaragwe
(74) *Attorney, Agent, or Firm* — Boisbrun Hofman, PLLC

(57) ABSTRACT

Apparatus and method for drilling out frac plugs. An example apparatus may include a data system configured to be communicatively connected with wellsite equipment for performing drill-out operations of frac plugs installed within a well. The data system may be operable to receive current drill-out data and historical drill-out data, determine optimal operational parameters of the wellsite equipment based on the current drill-out data and historical drill-out data, and display the determined optimal operational parameters for viewing by the human operator, thereby permitting the human operator to cause the wellsite equipment to perform the drill-out operations at the optimal operational parameters. The current drill-out data may include current specifications of the frac plugs. The historical drill-out data may include historical specifications of other frac plugs installed within other wells, and historical operational performance of other wellsite equipment during previously performed drill-out operations of the other frac plugs.

31 Claims, 4 Drawing Sheets

DRILLING OUT FRAC PLUGS

CROSS-REFERENCE TO RELATED APPLICATIONS

This application claims priority to and the benefit of U.S. Provisional Application No. 62/812,920, titled "DRILLING FRAC PLUGS WITH JOINED PIPE," filed Mar. 1, 2019, the entire disclosure of which is hereby incorporated herein by reference.

BACKGROUND OF THE DISCLOSURE

Wells are generally drilled into a land surface or ocean bed to recover natural deposits of oil and gas, and other natural resources that are trapped in geological formations in the Earth's crust. Testing and evaluation of completed and partially finished wells has become commonplace, such as to increase well production and return on investment. Downhole measurements of formation pressure, formation permeability, and recovery of formation fluid samples, may be useful for predicting economic value, production capacity, and production lifetime of geological formations. Furthermore, intervention operations in wells, such as perforating and fracturing operations, may also be performed to optimize well productivity. Consequently, in working with deeper and more complex wellbores, it has become more difficult to convey downhole tools, tool strings, tubulars, and other downhole equipment within the wellbore.

Downhole tools, such as plugging and perforating tools, may be utilized to set fracturing plugs (hereinafter "frac plugs") within a well to isolate and perforate portions of a wellbore and subterranean formation surrounding the wellbore to permit the formation to be fractured in stages to prepare the well for production. Plugging and perforating tools may be included as part of a tool string and deployed downhole along with other downhole tools. The tool string may be conveyed along the wellbore by applying controlled tension to the tool string from a wellsite surface via a conveyance line or other conveyance means. After a frac plug is set at a predetermined location along the wellbore, a length of casing and formation uphole from the frac plug may be perforated.

After fracturing operations are performed, the frac plugs may be retrieved to the surface or drilled out with a drill bit. Frac plugs may also be drilled out with mills or bits. However, such frac plug drill-out operations are currently not performed efficiently, because the drill-out operations are performed without considering or otherwise using sensor data from surface and downhole equipment used to perform the drill-out operations. For example, companies are not using performance analytics or real-time performance feedback from various wellsite equipment to optimize or otherwise improve the efficiency of the drill-out operations. Furthermore, performing the drill-out operations by using a jointed tubular drill string made up of a drill bit and a plurality of joined tubulars can be cheaper, faster, and more efficient than by using coiled tubing to perform such drill-out operations.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
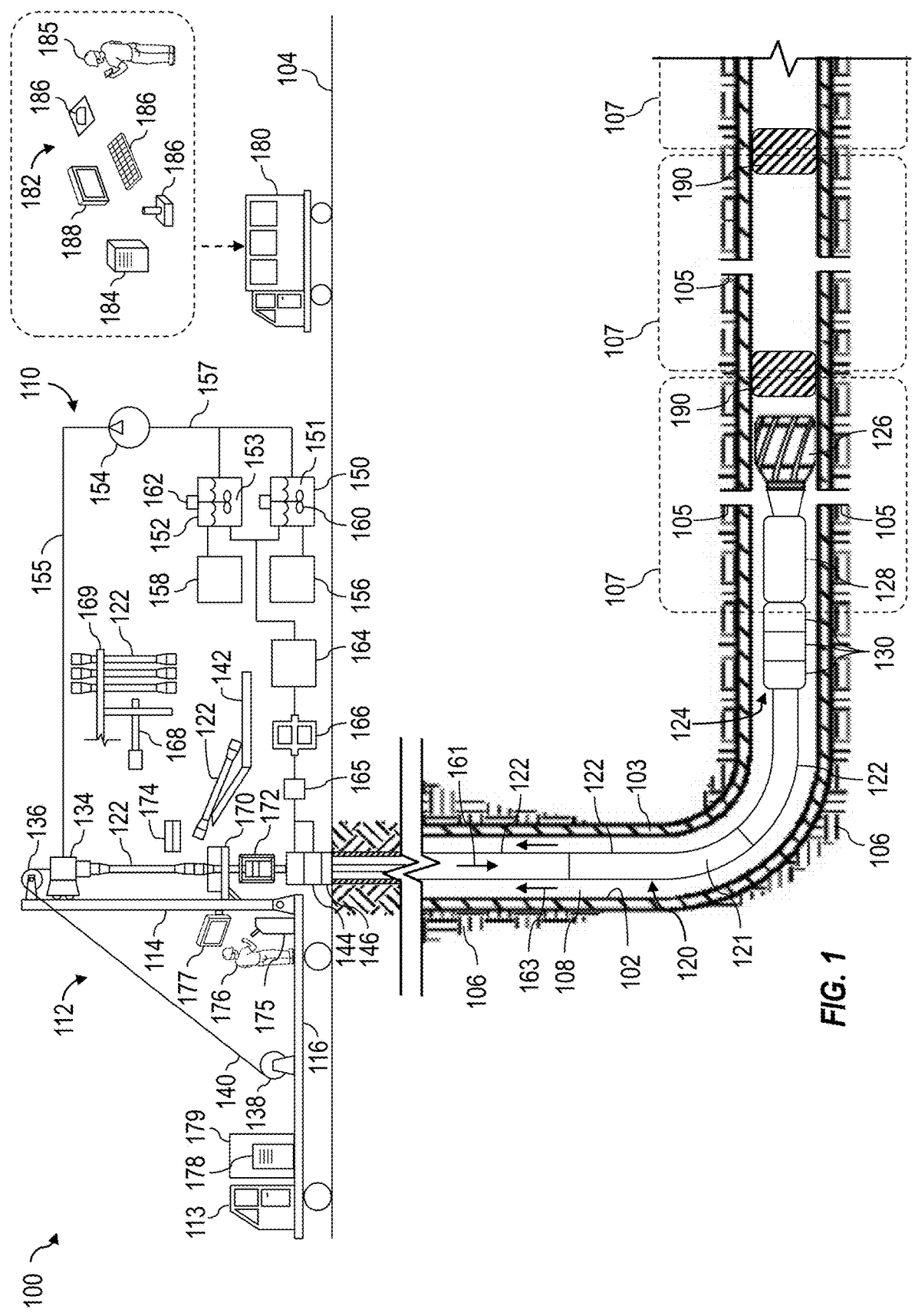
FIG. 1 is a schematic view of at least a portion of an example implementation of apparatus related to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows, may include embodiments in which the first and second features are formed in direct contact, and may also include embodiments in which additional features may be formed interposing the first and second features, such that the first and second features may not be in direct contact.

Terms, such as upper, upward, above, lower, downward, and/or below are utilized herein to indicate relative positions and/or directions between apparatuses, tools, components, parts, portions, members and/or other elements described herein, as shown in the corresponding figures. Such terms do not necessarily indicate relative positions and/or directions when actually implemented. Such terms, however, may indicate relative positions and/or directions with respect to a wellbore when an apparatus according to one or more aspects of the present disclosure is utilized or otherwise disposed within the wellbore. For example, the terms upper and upward may mean in the uphole direction, and the term lower and downward may mean in the downhole direction.

FIG. 1 is a schematic view of at least a portion of an example implementation of a wellsite system 100 according to one or more aspects of the present disclosure. The well system 100 represents an example environment in which one or more aspects of the present disclosure described below may be implemented. The wellsite system 100 is depicted in relation to a wellbore 102 formed by rotary and/or directional drilling extending from a wellsite surface 104 into a subterranean formation 106. The wellbore 102 may be a cased-hole implementation comprising a casing 103 secured by cement (not shown). The wellsite system 100 includes surface equipment 110 located at the wellsite surface 104 and a jointed tubular string 120 (e.g., a jointed tubular drill string) suspended within the wellbore 102. The wellsite system 100 may be operable to perform frac plug drill-out operations according to one or more aspects of the present disclosure. Namely, the jointed tubular string 120 and other equipment of the wellsite system 100 may be utilized to mill or drill out one or more frac plugs 190 set along the wellbore 102.

The surface equipment 110 may include a frac plug drilling rig 112 operable to facilitate performance of drill-out operations of the frac plugs 190 installed within the wellbore 102. The rig 112 may be operable to, by itself or in conjunction with other surface equipment 110, make up the jointed tubular string 120 from one or more downhole tools and a plurality of individual jointed tubulars 122. The rig 112 may include a support structure 114 (e.g., a mast or derrick) extending vertically adjacent to or above an opening of the wellbore 102 at the wellsite surface 104. The jointed tubular string 120 may be suspended within the wellbore 102 from the support structure 114. The support structure 114 may support a driver or power swivel 134, such as a top drive, operable to connect with an uphole end of the jointed tubular string 120 (i.e., an uppermost jointed tubular 122), and to impart rotary motion and vertical motion to the jointed tubular string 120. The power swivel 134 and the connected jointed tubular string 120 may be suspended from the support structure 114 via hoisting equipment, which may include a pulley or sheave 136 and a drawworks 138 storing a support line 140 (e.g., a support cable or drill line). The sheave 136 may be connected to or otherwise supported by the support structure 114 and the power swivel 134 may be connected with the line 140, such as via a traveling block and/or a hook, to operatively connect the power swivel 134 with the drawworks 138. The drawworks 138 may be mounted on or otherwise supported by a body 116 (i.e., a support frame) of the rig 112. The drawworks 138 may thus selectively impart tension to the support line 140 to lift and lower the power swivel 134, resulting in the vertical motion. The drawworks 138 may comprise a drum, a frame, and a prime mover (e.g., an engine or motor) operable to drive the drum to rotate and reel in the support line 140, causing the power swivel 134 to move upward. The drawworks 138 may be operable to release the support line 140 via a controlled rotation of the drum, causing the power swivel 134 to move downward.

The power swivel 134 may include or carry pipe hoisting equipment (not shown), such as tubular handling assembly links terminating with an elevator, and a drive shaft operatively connected with a prime mover, such as via a gear box or transmission. The jointed tubular string 120 may be mechanically coupled to the drive shaft. The prime mover may be selectively operated to rotate the drive shaft and the jointed tubular string 120 coupled with the drive shaft. Hence, the power swivel 134. in conjunction with operation of the drawworks 138, may advance the jointed tubular string 120 along the wellbore 102 to perform drill-out operations of frac plugs installed within the wellbore 102. The elevator may be utilized to handle the jointed tubulars 122 that are not mechanically coupled to the drive shaft. For example, when the jointed tubular string 120 is being tripped into or out of the wellbore 102 or the jointed tubulars 122 are moved onto or off of the rig 112, the elevator may grasp the jointed tubulars 122 of the jointed tubular string 120 such that the jointed tubulars 122 may be raised and lowered with respect to the rig 112. The power swivel 134 may have a guide system, such as rollers that track up and down a guide rail on the support structure 114 while the power swivel 134 is raised and lowered. The guide system may aid in keeping the power swivel 134 aligned with the wellbore 102, and in preventing the power swivel 134 from rotating during the drill-out operations by transferring reactive torque to the support structure 114.

The rig 112 may be implemented as a mobile rig 112 operable to be legally transported along the ground, including streets, highway, and other roadways, perhaps without special permitting and/or otherwise in compliance with state and/or federal transportation requirements. The rig 112 may comprise a truck portion 113 having a cab and an engine configured to power the wheels of the rig 112 to actuate movement of the wheels to move (e.g., roll) the rig 112 along the ground. The truck portion 113 may be connected to the body 116 and thus configured to move the body 116 and equipment connected to the body 116, including the support structure 114 and the drawworks 138, along the ground. In another implementation of the rig 112, the truck portion 113 may be separate from but connectable to the body 116, such as may permit the body 116 and the connected equipment to be hauled along the ground. The support structure 114 may be pivotally connected to the body 116, permitting the support structure 114 to be erected vertically for performing the frac plug drill-out operations and folded or lowered for transportation. The rig 112 may be transported along the ground in a disassembled configuration, for example, with the mast 114 lowered. While the rig 112 is being transported, the power swivel 134 may be located on the body 116 or connected to the mast 134. However, the power swivel 134 may be transported separately from the rig 112, such as via a truck, trailer, or other vehicle. Thus, the power swivel 134 may be connected to and form a portion of the rig 112 during rig assembly operations at the wellsite 104.

The rig 112 within the scope of the present disclosure may comprise equipment operable to, by itself or in conjunction with other surface equipment 110, make up the jointed tubular string 120 from one or more downhole tools and a plurality of individual jointed tubulars 122. The rig 112 may be configured to support the load of the individual jointed tubulars 122 and the jointed tubular string 120 as the jointed tubular string 120 is being made up (i.e., assembled) or removed (i.e., disassembled) from the wellbore 102. An implementation of the rig 112 may comprise hoisting equipment utilizing a plurality of pulleys, a drawworks, and a cable to hoist the jointed tubular string 120 (i.e., the jointed tubulars 122) into the wellbore 102 and to remove it from the wellbore 102. The hoisting equipment may use hydraulic cylinders configured to cycle up and down vertically to place the jointed pipe into the wellbore 102 and to remove it from the wellbore 102. An implementation of the rig 112 may be driven by one or more diesel and/or gasoline engines, electric motors, and/or hydraulic pumps or systems, and powered by hydrocarbons, alternating current (AC), or direct current (DC). An implementation of the rig 112 may be skidded or otherwise stationary, and/or may be temporarily or permanently installed at the wellsite surface 104 adjacent the wellbore 102. An implementation of the rig 112 may be trailer mounted, self-propelled, skid mounted (e.g., self-moving), and/or rail mounted (e.g., self-moving).

The wellbore 102 may be capped by a plurality (e.g., a stack) of fluid control devices 144 individually and/or collectively operable to direct and/or control flow of fluid out of the wellbore 102. The fluid control devices 144 may comprise blowout preventer (BOP) equipment selectively operable to prevent flow of formation fluid out of the wellbore 102. The BOP equipment may comprise a BOP stack operable to control the fluid within the wellbore 102 via a series of pressure barriers (e.g., rams) between the wellbore 102 and the wellsite surface 104. The BOP equipment may comprise an annular preventer. The fluid control devices 144 may comprise a rotating control device (RCD) mounted above the annular preventer. The fluid control devices 144 may be mounted on top of a well termination device 146 (e.g., a casing flange or wellhead) terminating the wellbore 102 at the surface 104. The jointed tubular string 120 may be deployed into or retrieved from the wellbore 102 through the well termination device 146 and the fluid control devices 144.

The jointed tubular string 120 may comprise a plurality of interconnected (e.g., joined or coupled) jointed tubulars 122 (e.g., drill pipes or drill tubing) that are configured to be coupled or joined together and conveyed within the wellbore 102. The jointed tubular string 120 may terminate with a milling, drilling, or hybrid bit 126 (collectively referred to hereinafter as "a drill bit"). The jointed tubular string 120 may also include a bottom-hole assembly (BHA) 124 connected above the drill bit 126. The BHA 124 may comprise various downhole tools 130 and/or a downhole fluid powered motor 128. Rotation of the drill bit 126 and the weight of the jointed tubular string 120 are collectively operable to perform the frac plug drill-out operations within the scope of the present disclosure. The drill bit 126 may be rotated from the wellsite surface 104 by the power swivel 134 connected to an upper end of the jointed tubular string 120 (or to a saver sub or other intervening components) and/or by the downhole motor 128 connected with the drill bit 126.

One or more of the downhole tools 130 may be or comprise one or more measurement-while-drilling (MWD) tools, each comprising one or more sensors operable for the acquisition of drill-out data (e.g., sensor measurements) comprising or indicative of operational performance or characteristics of the BHA 124, the wellbore 102, and/or fluids utilized during the drill-out operations. For example, one or more of such downhole tools 130 may be or comprise a gravity sensor, a pressure sensor, a rotational speed sensor, a temperature sensor, a torsion sensor, and/or other sensors. One or more of the downhole tools 130 and/or another portion of the BHA 124 may comprise a telemetry device operable for communication with the surface equipment 110, such as via mud-pulse telemetry. One or more of the downhole tools 130 and/or another portion of the BHA 124 may comprise a downhole processing device operable to receive, process, and/or store information received from the surface equipment 110, the downhole tools 130, and/or other portions of the BHA 124. The processing device may store executable computer program code or instructions, including for implementing one or more aspects of the operations and/or methods described herein.

The wellsite system 100 may further include a fluid circulation system operable to circulate fluids between the surface equipment 110 and the drill bit 126 during different phases of the drill-out operations. For example, the fluid circulation system may be operable to inject a drilling fluid 151 and a flushing (i.e., sweeping) fluid 153 from the wellsite surface 104 into the wellbore 102 via an internal fluid passage 121 extending longitudinally through the jointed tubular string 120. The fluid circulation system may comprise a drilling fluid container 150 for holding the drilling fluid 151 and a flushing fluid container 152 for holding the flushing fluid 153. The drilling fluid 151 may be or comprise water, such as fresh water or brine. The flushing fluid may be or comprise a gel or another viscous fluid. The fluid circulation system may comprise one, two, or more fluid pumps 154 operable to move the drilling fluid 151 from the container 150 and the flushing fluid 153 from the container 152 into an internal fluid passage 121 of the jointed tubular string 120 via a fluid conduit 155 and the power swivel 134. The fluid conduit 155 may comprise one or more of a pump discharge line, a stand pipe, a rotary hose, and a gooseneck (not shown) connected with a fluid inlet of the power swivel 134. The pump 154 and each of the containers 150, 152 may be fluidly connected by a fluid conduit 157, such as a suction line.

Although the example wellsite system 100 described above comprises a fluid circulation system operable to pump the drilling and flushing fluids into the wellbore 102 via the jointed tubular string 120 and receive the fluids returning to the surface 104 via the wellbore annulus 108, the wellsite system 100 may instead comprise a reverse fluid circulation system operable to pump the drilling and flushing fluids into the annulus 108 of the wellbore 102 and receive the fluids returning to the surface 104 via the jointed tubular string 120. Thus, the reversed fluid circulation system may pump the drilling and flushing fluids downhole to the drill bit 126 along the annulus 108 and uphole from the drill bit 126 within the jointed tubular string 120.

The drilling and flushing fluids 151, 153 may be mixed or otherwise formed at the wellsite 104. For example, the drilling fluid container 150 may be fluidly or otherwise operatively connected with a chemical container 156 containing predetermined chemicals and/or additives that may be selectively transferred into the drilling fluid container 150 to modify chemical and/or physical properties of the drilling fluid 151. The chemicals may include, for example, a friction reducer, a lubricant, and/or a viscosity modifier. The flushing fluid container 152 may be fluidly or otherwise operatively connected with a chemical container 158 containing predetermined chemicals and/or additives that may be selectively transferred into the flushing fluid container 152 to modify chemical and/or physical properties of the flushing fluid 153. The chemicals may include, for example, a gelling agent and/or a viscosity modifier. During the drill-out operations, the above listed chemicals may be added to the corresponding containers 150, 152 to form or modify the drilling and flushing fluids 151, 153, respectively. Each container 150, 152 may be fluidly connected with a common or corresponding source (e.g., tanks) (not shown) of a base fluid (e.g., water), such as may be utilized to form the drilling and flushing fluids. A mixing device 160, 162 (e.g., paddles) may be installed within each container 150, 152 to blend or otherwise mix the chemicals and the base fluids that were transferred into each container 150, 152. Each fluid 151, 153 may be made in batches or made on the fly, such as by continuously pumping in the base fluid, adding chemicals, mixing, and then pumping the fluids 151, 153 downhole via the pump 154 at predetermined times during the drill-out operations.

During a drilling phase of the drill-out operations, while the drill bit 126 is utilized to drill out a frac plug 190, the drilling fluid 151 may be pumped out of the container 150 by the pump 154 and downhole through the internal passage 121 of the jointed tubular string 120, as indicated by directional arrow 161. Similarly, during a flushing phase of the drill-out operations, the flushing fluid 153 may be pumped out of the container 152 by the pump 154 and downhole through the internal passage 121 of the jointed tubular string 120, as indicated by the directional arrow 161, to flush out (e.g., wash or sweep out) cuttings (i.e., drilled out particles) of one or more frac plugs 190 out of the wellbore 102. A frac plug 190 may comprise, for example, a soft steel (e.g., cast iron) or a hybrid material (e.g., metal and elastomers).

Each fluid 151, 153 may exit the BHA 124 via ports in the drill bit 126 and then circulate uphole through an annulus 108 (i.e., annular space) of the wellbore 102 defined between an exterior of the jointed tubular string 120 and the wall of the wellbore 102, such flow being indicated by directional arrows 163. In this manner, the drilling fluid 151 lubricates the drill bit 126 during the drilling phases of the frac plug drill-out operations and the flushing fluid 153 carries the frac plug cuttings uphole to the wellsite surface 104 during the flushing phases of the drill-out operations. Each returning fluid 151, 153 may exit the annulus 108 via a port in a fluid control device 144 and/or via a ported adapter (e.g., a spool, a wing valve, a flow cross, etc.), which may be located above, below, or between one or more of the fluid control devices 144.

Each fluid 151, 153 exiting the annulus 108 may be directed toward fluid reconditioning equipment 164 via a fluid conduit (e.g., gravity return line, high pressure piping) to be cleaned and/or reconditioned prior to being returned to its corresponding container 150, 152 for recirculation. Each fluid 151, 153 exiting the annulus 108 may pass through various wellsite equipment prior to being returned to its container 150, 152 for recirculation. For example, each fluid 151, 153 may pass through a choke manifold 166, which may include at least one choke and a plurality of fluid valves collectively operable to control the flow through and out of the choke manifold 166. Backpressure may be applied to the annulus 108 by variably restricting flow of the fluid 151, 153 flowing through the choke manifold 163. The greater the restriction to flow through the choke manifold 166, the greater the backpressure applied to the annulus 108.

Before being returned to its corresponding container 150, 152, the fluid 151, 153 returning to the wellsite surface 104 may be cleaned and/or reconditioned via the fluid reconditioning equipment 164, which may include one or more of liquid gas separators, settling tanks, shakers, centrifuges, junk catchers, filters, and other fluid cleaning equipment. The liquid gas separators may remove formation gasses entrained in the fluid 151, 153 discharged from the wellbore 102 and the settling tanks, shakers, centrifuges, junk catchers, and filters (e.g., soft filter pods) having a predetermined particle (i.e., micron) rating may separate and remove the frac plug cuttings from each fluid 151, 153. The settling tanks may be utilized to hold the fluid 151, 153 while solid contaminants settle. The fluid 151, 153 may then progresses through other stages or portions of the fluid reconditioning equipment 164. The cleaned/reconditioned fluid 151, 153 may be transferred to its fluid container 150, 152 and the solid contaminants removed from the fluid 151, 153 may be examined (e.g., weighed, sized) to determine quality, efficiency, and other operational parameters of the drill-out operations. Although the fluid reconditioning equipment 164 and the fluid mixing equipment 150, 152 are shown as separate and distinct pieces of equipment, the fluid reconditioning equipment 164 and the fluid containers 150, 152 may be implemented as part of a single piece of equipment.

A filter 165 (i.e., a junk catcher) may also or instead be installed upstream from the choke manifold 166 (e.g., at the choke manifold inlet, at an outlet port of the well) or upstream from the fluid reconditioning equipment 164 to catch, remove, and/or filter out cuttings of the drilled-out frac plugs (i.e., the frac plug cuttings) from the fluids 151, 153 returning to the well surface 104. The filter 165 may automatically determine size and/or weight of the frac plug cuttings or permit the frac plug cuttings to be examined (e.g., weighed, sized) by wellsite personnel, such as to determine quality, efficiency, and other operational parameters of the drill-out operations.

The surface equipment 110 may include tubular handling equipment operable to store, move, connect, and disconnect the jointed tubulars 122 to assemble and disassemble the jointed tubular string 120 during the frac plug drill-out operations. For example, a catwalk 142 may be utilized to convey tubulars from a ground level, such as along the wellsite surface 104, to a rig platform or floor 170 installed above the fluid control equipment 144, permitting the tubular handling assembly to grab and lift the tubulars above the wellbore 102 for connection with a previously deployed pipe 122. The rig floor 170 may be connected to or otherwise supported by the support structure 114. The catwalk 142 may have a horizontal portion and an inclined portion that extends between the horizontal portion and the rig floor 170. The catwalk 142 may comprise a skate movable along a groove extending longitudinally along the horizontal and inclined portions of the catwalk 142. The skate may be operable to convey (e.g., push) each jointed tubular 122 along the catwalk 142 to the rig floor 170. The skate may be driven along the groove by a drive system, such as a pulley system or a hydraulic system. Additionally, one or more racks may adjoin the horizontal portion of the catwalk 142. The racks may have a spinner unit for transferring tubulars to the groove of the catwalk 142.

The tubular handling equipment may further include a pipe handling manipulator (PHM) 168 disposed in association with a pipe rack or fingerboard 169. Although the PHM 168 and the fingerboard 169 are shown separate and distinct from the support structure 114, each of the PHM 168 and the fingerboard 169 may be supported by or otherwise connected with the support structure 114 or another portion of the rig 112. The fingerboard 169 provides storage (e.g., temporary storage) of the jointed tubulars 122 (or stands of two or three jointed tubulars 122) during various operations, such as during tripping operations. The fingerboard 169 may define a plurality of slots configured to support or otherwise hold the jointed tubulars 122. The PHM 168 may be operable to transfer the jointed tubulars 122 between the fingerboard 169 and the jointed tubular string 120 (i.e., space above the suspended jointed tubular string 120). For example, the PHM 168 may include arms terminating with clamps, such as may be operable to grasp and/or clamp onto one of the jointed tubulars 122. The arms of the PHM 168 may extend and retract, and/or at least a portion of the PHM 168 may be rotatable and/or movable toward and away from the jointed tubular string 120, such as may permit the PHM 168 to transfer the jointed tubulars 122 between the fingerboard 169 and the jointed tubular string 120.

The rig 112 may also comprise or be utilized in conjunction with a snubbing unit 172 operable to run and retrieve the jointed tubular string 120 into and out of a live well 102. The snubbing unit 172 may comprise opposing traveling slips operable to support the weight of the jointed tubular string 120 under pipe heavy conditions and to snub the jointed tubular string 120 under pipe light conditions. The snubbing unit 172 may further comprise opposing stationary slips operable to support the weight of the jointed tubular string 120 under pipe heavy conditions and to hold the jointed tubular string 120 in position under pipe light conditions. A hydraulic jack may be utilized to raise and lower the traveling slips and the jointed tubular string 120 held by the traveling slips to run and retrieve the jointed tubular string 120 under the pipe heavy and pipe light conditions. The traveling slips may be connected with rods or moving portion of the hydraulic jack, while the stationary slips may be connected with a body or stationary portion of the hydraulic jack. The annular BOP of the fluid control equipment 144 may be connected below the stationary slips, connecting the stationary slips with the stationary portion of the hydraulic jack. When fluidly connected with the wellbore 102, the annular BOP may be operable to control wellbore fluids by sealing on the jointed tubular string 120 during deployment and retrieval. When utilized, the snubbing unit 172 may comprise or support the rig floor 170 (e.g., a work basket), which may house snubbing unit controls and support human wellsite operators handling the jointed tubulars 122 of the jointed tubular string 120 being run or retrieved via the snubbing unit 172.

The rig 112 may also comprise or be utilized in conjunction with various torqueing equipment 174 operable to make up and break down the jointed tubular string 120 being run or retrieved with or without the snubbing unit 172. The torqueing equipment 174 may include wrenches and/or power tongs, which may be contained within or suspended above the rig floor 170 for use by the human operators. The torqueing equipment 174 may be moveable toward and at least partially around the jointed tubular string 120, such as may permit the torqueing equipment 174 to make up and break out connections of the jointed tubular string 120. The torqueing equipment 174 may also be moveable away from the jointed tubular string 120 to move clear of the jointed tubular string 120 when rotated during the frac plug drill-out operations. When the snubbing unit 172 is not installed above the wellhead 146, the rig floor 170 may be coupled with and supported in position by the support structure 114. Instead of or addition to the snubbing unit 172, other equipment, such as a jointed tubular injector, may be utilized in conjunction with the rig 112 to run and/or retrieve the jointed tubular string 120 comprising a plurality of jointed tubulars 122 into and/or out of the wellbore 102.

During drill-out operations, the hoisting equipment (e.g., the drawworks 138) may be utilized to lower the jointed tubular string 120 while the power swivel 134 rotates the jointed tubular string 120 to advance the jointed tubular string 120 downward within the wellbore 102. Automated or manual slips (not shown) located at the rig floor 170 may be utilized to alternatingly hold the upper end of the jointed tubular string 120 or permit movement of the jointed tubular string 120 during pipe make up and break out operations. The slips may be in a closed position during the make up and break out operations to clamp an upper end of the jointed tubular string 120 to thereby suspend and prevent advancement of the jointed tubular string 120 within the wellbore 102. The slips may be in an open position during the drill-out operations to permit advancement of the jointed tubular string 120 along the wellbore 102.

The rig 112 may further comprise a control station 175 for controlling various wellsite equipment forming the rig 112 and other wellsite equipment of the wellsite system 100. The control station 175 may be communicatively or otherwise operatively (e.g., fluidly or mechanically) connected with the wellsite equipment, such as may permit the control station 175 to control operational performance of the rig 112 and the other wellsite equipment. The control station 175 may be operatively connected with the drawworks 138 and other portions of the hoisting system, the power swivel 134, the torqueing equipment 174, the PHM 168, the catwalk 142, the pump 154 and other portions of the fluid circulation system, the chemical containers 156, 158, the fluid containers 150, 152, the well control system, and the BHA 124, among other examples. The control station 175 may comprise a plurality of input devices (i.e., control devices) usable by a wellsite operator 176, such as a driller or rig operator, to control the rig 112 and the other wellsite equipment. The input devices may comprise, for example, electrical or mechanical joysticks, levers, buttons, and other input devices. The control station may also comprise one or more output devices (e.g., gauges, video monitors, lights, audio speakers, etc.) operable to visually (and perhaps audibly) show or indicate to the wellsite operator 176 operational performance status of the rig 112 and the other wellsite equipment. A human-machine interface (HMI) device 177 may be installed on the rig 112 adjacent the control station 175. The HMI device 177 may be or comprise a video output device, such as a video screen. The HMI device 177 may instead be or comprise a video touchscreen operable via finger (and/or stylus, e.g.) contact by the wellsite operator 176, and thus operate as both an input device and an output device.

The rig 112 may carry a processing device 178 (e.g., a controller, a programmable logic controller (PLC), a computer, etc.), such as may be operable to receive, process, and output information to monitor operational performance of and provide control to one or more portions of the wellsite system 100. For example, the processing device 178 may be communicatively connected with various surface and downhole equipment described herein, and may be operable to receive measurements or data comprising or indicative of operational performance from such equipment and transmit control data to such equipment to perform various operations described herein. The processing device 178 may be communicatively connected with the control station 175 and/or with the HMI device 177. Thus, the processing device 178 may be operable to communicate with (e.g., monitor and/or control) the wellsite equipment directly or via the control station 175.

The processing device 178 may be communicatively connected wellsite equipment forming the rig 112 and the other wellsite equipment, such as may permit the processing device 178 to receive operational performance (i.e., status) data from such wellsite equipment and output control data (i.e., control commands) to such wellsite equipment. The processing device 178 may be communicatively connected with the drawworks 138 and other portions of the hoisting system, the power swivel 134, the torqueing equipment 174, the PHM 168, the catwalk 142, the pump 154 and other portions of the fluid circulation system, the chemical containers 156, 158, the fluid containers 150, 152, the well control system, and the BHA 124, among other examples. The processing device 178 may store executable computer program code, instructions, and/or operational parameters or set-points, including for implementing one or more aspects of methods and operations described herein. The processing device 178 may be housed within a protective enclosure 179. The processing device 178 may be carried by or housed at another location of the wellsite system 100, instead of the rig 112. Communication between the processing device 178, the control station 175, the HMI device 177, and the various equipment of the wellsite system 100 may be via wired and/or wireless communication means. However, for clarity and ease of understanding, such communication means are not depicted, and a person having ordinary skill in the art will appreciate that such communication means are within the scope of the present disclosure.

The control station 175, the HMI device 177, and the processing device 178 may be utilized to monitor and control the various equipment of the wellsite system 100 to cause the wellsite system 100 to collectively perform the drill-out operations of the frac plugs 190 installed within the wellbore 102. For example, the wellsite system 100 may be caused to perform the frac plug drill-out operations, namely, to mill or drill out the frac plugs 190 that have been set along the wellbore 102 during wellbore plugging and perforating ("plug and perf") operations. During such plug and perf operations, the formation 106 surrounding the wellbore 102 may be fractured in stages ("frac stages"). For example, a plurality of frac plugs 190 may be set at predetermined positions (i.e., depths) within the wellbore 102 to isolate or seal off different portions or zones 107 of the wellbore 102 and formation 106 surrounding the wellbore 102. After each frac plug 190 is set, a perforating tool may be used to make perforations 105 through the casing 103 and the formation 106 uphole from the newly set frac plug 190. Thereafter, the formation 106 may be fractured. If the frac plugs 190 are permanent type or if a frac plug 190 is unable to be retrieved to the surface, such frac plugs 190 may be drilled out during drill-out operations.

Accordingly, the wellsite system 100 may be utilized to make up a jointed tubular string 120 from a plurality of downhole tools (e.g., drill bit 126, motor 128, sensor tools 130, etc.) and a plurality of jointed tubulars 122, and perform the drill-out operations, as described herein, to drill out the frac plugs 190 set along the wellbore 102 in preparation for production phase of the well. Although the jointed tubular string 120 is shown utilized in a horizontal portion of the wellbore 102, it is to be understood that the wellsite system 100, including the jointed tubular string 120, may be utilized in vertical, curved, and other deviated portions of the wellbore 102 to drill out the frac plugs 190.

A remote monitoring and control center 180 may be located at the wellsite 104 at a distance from the rig 112. The center 180 may instead be located offsite at a distance from the wellsite 104. The center 180 may house therein a workstation 182, which may be operated by a human operator 185 to monitor and/or control various wellsite equipment or portions of the wellsite system 100, such as the rig 112, the power swivel 134, the hoisting system, the tubular handling system, the fluid circulation system, the well control system, and/or the BHA 124, among other examples. The center 180 may be or comprise a mobile center, comprising a truck, a trailer, or another mobile piece of equipment operable to be driven or otherwise moved along the ground via roadways. The operator 185 may be a wellsite supervisor, a company man, or a third party user who is granted access.

The workstation 182 may comprise or be communicatively connected with a processing device 184 (e.g., a controller, a computer, etc.), such as may be operable to receive, process, and output information to monitor operational performance of and provide control to one or more portions of the wellsite system 100. For example, the processing device 184 may be communicatively connected with the various surface and downhole equipment described herein, and may be operable to receive measurements or data comprising or indicative of operational performance from such equipment and transmit control data to such equipment to perform various operations described herein. The processing device 184 may store executable computer program code, instructions, and/or operational parameters or setpoints, including for implementing one or more aspects of methods and operations described herein. Similarly to control station 175, the HMI device 177, and the processing device 178, the workstation 182 may be utilized to monitor and/or control the various equipment of the wellsite system 100 to cause the wellsite system 100 to collectively perform the drill-out operations of the frac plugs 190 installed within the wellbore 102.

The workstation 182 may be operable for entering or otherwise communicating control data to the processing device 184 by the operator 185, and for displaying or otherwise communicating information from the processing device 184 to the operator 185. The workstation 182 may comprise a plurality of HMI devices, including one or more input devices 186 (e.g., a keyboard, a mouse, a joystick, a touchscreen, etc.) and one or more output devices 188 (e.g., a video monitor, a touchscreen, a printer, audio speakers, etc.). Communication between the processing device 184, the input and output devices 186, 188, and the various equipment of the wellsite system 100 may be via wired and/or wireless communication means. However, for clarity and ease of understanding, such communication means are not depicted, and a person having ordinary skill in the art will appreciate that such communication means are within the scope of the present disclosure.

The wellsite system 100 within the scope of the present disclosure may include more or fewer components than as described above and depicted in FIG. 1. Additionally, various equipment and/or subsystems of the wellsite system 100 may include more or fewer components than as described above and depicted in FIG. 1. For example, various sensors, engines, motors, hydraulics, actuators, valves, fluid conduits, electrical conductors, and/or other components not explicitly described herein may be included in the wellsite system 100 and are within the scope of the present disclosure.

The present disclosure is further directed to a data acquisition, processing (e.g., computing or analyzing), and output system (hereinafter referred to collectively as "a data system") operable to receive and analyze various current and historical drill-out data, and determine optimal operational parameters of the surface and downhole wellsite equipment of the wellsite system 100 currently used for performing frac plug drill-out operations based on the received current and historical drill-out data. The optimal operational parameters may be or comprise operational parameters for the wellsite equipment that the data system calculated to be optimal, and thus the optimal operational parameters may be or comprise calculated or recommended operational parameters. The data system may thus optimize or otherwise reduce drill-out times of frac plugs by receiving and analyzing current drill-out data, such as current (i.e., real-time) operational performance data comprising or indicative of current operational performance of the wellsite equipment currently used to perform the drill-out operations, and current physical and operational specifications (i.e., characteristics) of the wellsite equipment. The data system may thus optimize or otherwise reduce drill-out times of frac plugs by further receiving and analyzing historical drill-out data, such as historical (i.e., previously generated and recorded) operational performance data comprising or indicative of historical operational performance of other (or the same) wellsite equipment during previously performed drill-out operations, and historical physical and operational specifications of the other (or same) wellsite equipment used to perform the other previously performed drill-out operations. Such current and historical drill-out data may be used to determine optimal operational parameters for the surface and/or downhole wellsite equipment to minimize overall time for completing the drill-out operations (e.g., by reducing individual plug drill-out times) and/or cost of the drill-out operations.

During the drill-out operations, equipment sensors may be utilized to stream in real-time operational performance data of surface and downhole wellsite equipment of the wellsite system 100. The data system may capture and analyze in real-time operational performance data and other data entered to the data system. Such data may be consolidated or otherwise recorded into an operational performance database, which may be located onsite and/or offsite, and accessible via a communication network. The data system may determine and output optimal operational parameters of the wellsite equipment for performing the drill-out operations based on the current drill-out data and the historical drill-out data. The data system may also determine or generate individual and multiple well performance analytics and end of job reporting.

The optimal operational parameters and/or the current operational performance data may be displayed to the wellsite operator 176, who can then operate the rig 112 and other wellsite equipment based on or pursuant to the optimal operational parameters and/or current operational performance data to enhance operational performance. The data system may also output control data (i.e., control commands) to cause the wellsite equipment to perform the drill-out operations pursuant to the optimal operational parameters. For example, the data system may output control data comprising or indicative of the determined optimal operational parameters to the wellsite equipment to cause the wellsite equipment to perform the drill-out operations. The optimal operational parameters and the current and historical operational performance data recorded or being transmitted to the database may be accessed by the operator 185 for monitoring and decision making.

Figure 2:
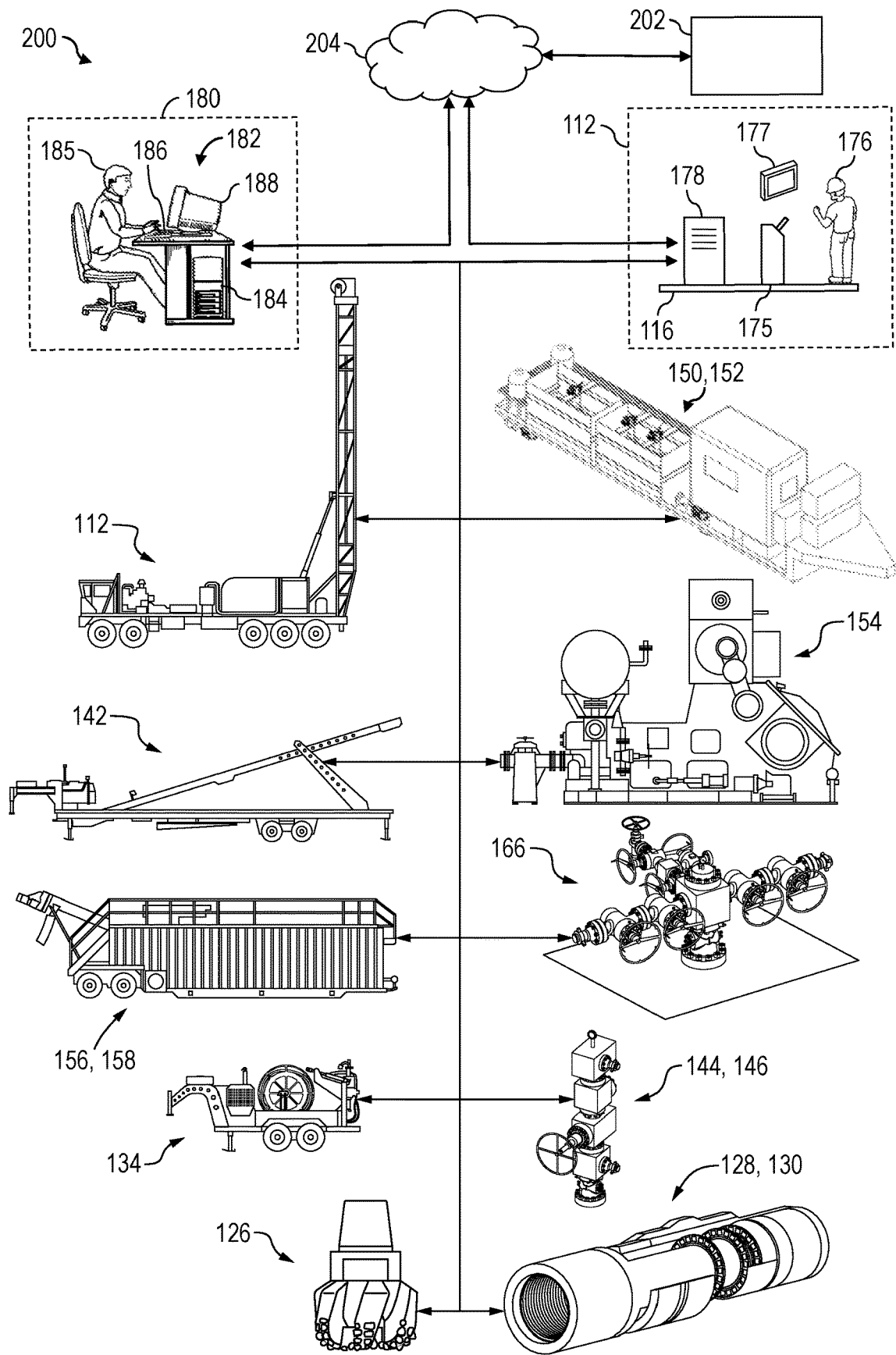
FIG. 2 is a schematic view of at least a portion of an example implementation of apparatus related to one or more aspects of the present disclosure.

Accordingly, the present disclosure is further directed to a data system for receiving and analyzing current and historical drill-out data, and determining optimal operational parameters of the wellsite equipment for performing the drill-out operations based on the current and historical drill-out data, such as to assist (e.g., guide or direct) a wellsite operator to control the wellsite equipment to perform the drill-out operations, and/or to automatically control the wellsite equipment to perform the drill-out operations. FIG. 2 is a schematic view of at least a portion of an example implementation of a data system 200 for receiving, analyzing, and outputting information to facilitate optimal performance of the drill-out operations of frac plugs 190 installed in a wellbore 102 shown in FIG. 1. The data system 200 may comprise one or more portions of the wellsite system 100 shown in FIG. 1. Accordingly, the following description refers to FIGS. 1 and 2, collectively.

The data system 200 may comprise the processing device 178 and the HMI device 177. The processing device 178 may be communicatively connected with various sensors, each disposed in association with a corresponding piece of the wellsite equipment forming the wellsite system 100 and, thus, permit the processing device 178 to monitor operational performance of such wellsite equipment. Each sensor may be operable to output current operational performance data indicative of a current operational performance of the corresponding piece of the wellsite equipment during the drill-out operations. The processing device 178 may be communicatively connected with the rig 112, including the drawworks 138. The processing device 178 may be communicatively connected with the catwalk 142, the chemical containers 156, 158, the power swivel 134, the drill bit 126, the downhole tools 130, the downhole motor 128, the wellhead 146, the fluid control devices 144, the choke manifold 166, the pump 154, and the fluid containers 150, 152. The processing device 178 may also be communicatively connected with the PHM 168, the fluid reconditioning equipment 164, the junk catcher or filter 165, the snubbing unit 172, the jointed pipe injector, and the torqueing equipment 174, shown in FIG. 1.

The communicative connection between the processing device 178 and the various sensors of the wellsite equipment forming the wellsite system 100 may permit the processing device 184 to receive, monitor, and analyze in real-time current operational performance data comprising or indicative of current operational performance of the wellsite equipment during current drill-out operations. The processing device 178 may also receive current wellsite specifications, such as physical and operational specifications, statistical data, maintenance data, environmental (i.e., weather) data, and/or other data or information associated with, indicative of, or affecting the well (e.g., the wellbore 102), the surface equipment 110, the downhole equipment 103, 120, 124, 126, 190, and other wellsite equipment of the wellsite system 100 used during the current drill-out operations.

The current operational performance data and the current wellsite specifications (collectively referred to as "current drill-out data") received by (or input to) the processing device 187 may include, for example: well specifications (e.g., total vertical depth of the wellbore, measured depth of the wellbore, dog leg severity, inclination, wellbore path, and perforation locations, etc.); casing specifications; well inner diameter (e.g., casing inner dimeter); well orientation; well path; well pressure; well temperature; number of frac plugs in the well; depth of the frac plugs within the well; distance between frac plugs; number of frac plugs drilled; shortest time on frac plug; longest time on frac plug; average plug drill-out time; average rate of penetration (ROP) on frac plug; average time between drilling out frac plugs; average weight on bit on frac plug; average pump rate on frac plug (e.g., barrels per minute (BPM)); average surface pump pressure on frac plug; average swivel revolutions per minute (RPM) on frac plug; average downhole motor RPM on frac plug; average differential pressure on bit on frac plug; average connection time slip to slip; total job time—beginning of rig up to end of rig down; total drilling out time (start drilling out the first frac plug to finishing drilling out the last frac plug); type of drilling fluid; average drilling fluid weight; average gel viscosity; quantity of gel pumped (e.g., barrels (BBLS)); quantity of friction reducer pumped (e.g., gallons (GAL)); quantity of other chemicals pumped (e.g., GAL, BBLS); number of gel sweeps (i.e., flushes) pumped; ratio of gel sweeps per frac plug; average number of barrels in each gel sweep; average barrels in and average barrels out; total barrels of fluid pumped; total barrels of fluid lost; total barrels of fluid recovered; number of times well circulated bottoms up; ratio of circulating bottoms up, per frac plug; number of short trips; ratio of short trips, per frac plug; rig and auxiliary equipment repair time (including repair time for: the rig, the support structure, the drawworks, the rig power equipment (e.g., engine, transmission, etc.), and the pumps); pump power (e.g., engine/transmission); pump operational and physical characteristics (e.g., manufacturer, recommended and critical operational parameters, model, etc.); pipe handler; power swivel operational and physical characteristics (e.g., manufacturer, recommended and critical operational parameters, model, size, weight, etc.); instrumentation; flow back equipment; fluid systems; snubbing unit; jointed pipe injector; weather; waiting on orders; wireline depth; tubing depth; rig and auxiliary equipment repair time; jointed tubular (e.g., identification) number; start time (tag frac plug and begin drilling out a frac plug); stop time (finished drilling out a frac plug); weight on bit (pounds) while drilling out a frac plug; weight on bit (points) while drilling out a frac plug; barrels in and barrels out; length of the jointed tubular string (e.g., footage out); time between frac plugs; rate of penetration through each frac plug; total drilling out time on frac plug; differential pressure on bit; connection time (slip to slip); other BHA components; snubbing (Yes/No); drill fluid type; drill fluid weight; gel viscosity; pump strokes per minute; pump rate total (e.g., BPM); pump stroke count; pump total stroke count; stand pipe pump pressure; power swivel torque output; drill tubing (max torque during drill-out operations and free torque during drill-out operations); BBLS of gel circulated after frac plug; BBLS of drill fluid circulated after frac plug; circulating while rotating or reciprocating; well head pressure; choke manifold pressure; friction reducer specifications and quantity; other chemicals specification and quantity; frac plug physical specifications (e.g., manufacturer, model, size, weight, etc.); frac plug cuttings weight; frac plug cuttings size; drill bit type; drill bit operational and physical specifications (e.g., manufacturer, recommended and critical operational parameters, model, size, weight, etc.); downhole motor operational and physical specifications (e.g., manufacturer, recommended and critical operational parameters, model, size, weight, etc.); work string size, grade, and weight; downhole check valve quantity and specifications (e.g., inner diameter (ID), outer diameter (OD), overall length (OAL), etc.); and seat nipple specifications (e.g., ID, OD, OAL, etc.).

The processing device 178 may receive and process (e.g., analyze) the current drill-out data according to a previously entered computer program code. Some of the current operational performance data listed above may be or comprise raw current operational performance data comprising current operational performance data output by sensors of the wellsite equipment, and some of the current operational performance data may be or comprise processed (e.g., reformatted) current operational performance data that is calculated or otherwise determined in real-time by the processing device 178 based on the raw current operational performance data. The processed current operational performance data may include various performance analytics and efficiency metrics.

The processing device 178 may also receive and process historical drill-out data comprising or indicative of historical wellsite specifications of other wells at other wellsites and other (or the same) wellsite equipment used during previously performed drill-out operations at the other wellsites. The historical drill-out data may also comprise or be indicative of historical operational performance data comprising or indicative of historical operational performance of the other (or the same) wellsite equipment during the previously performed drill-out operations. For example, the historical wellsite specifications may include historical specifications of other wells at the other wellsites, historical specifications of previously used drill bits, downhole motors, surface pumps, and power swivels, and/or historical specifications of other frac plugs installed within the other wells. The historical operational performance data and the historical wellsite specifications may be or comprise one or more of the current operational performance data and the current wellsite specifications listed above, but were previously captured and recorded during the previously performed drill-out operations. The historical drill-out data may also comprise or be indicative of historical MWD data recorded during drilling operations of the other wells at the other wellsites. The historical MWD data may comprise data that was generated by one or more of an acoustic tool, a density tool, a depth correlation tool, a directional tool, an electromagnetic (EM) tool, a formation testing tool, a gamma ray (GR) tool, a gravity tool, a formation logging tool, a magnetic resonance tool, a formation measurement tool, a neutron tool, a nuclear tool, a resistivity tool, and a surveying tool, among other examples. The historical operational performance data, the historical wellsite specifications, and the historical MWD data may be collectively referred to as "historical drill-out data."

The raw and processed current operational performance data may be provided in real-time as a performance feedback loop to the wellsite operator 176, who may utilize the information to manually change operational parameters of the wellsite system 100 to optimize efficiency of the drill-out operations. For example, the processing device 178 may output the raw and processed current operational performance data to the HMI device 177 to display the raw and processed current operational performance data, thereby permitting the wellsite operator 176 to view the raw and processed current operational performance data. The wellsite operator 176 may then make control decisions based on the raw and processed current operational performance data. For example, the wellsite operator 176 may operate the wellsite equipment via the control station 175 based on the output raw and processed current operational performance data to cause the wellsite equipment to perform the drill-out operations.

The processing device 178 may also or instead output information indicative of means to optimize or otherwise improve efficiency of the frac plug drill-out operations performed by the wellsite system 100. The wellsite operator 176 may program the equipment of the wellsite system 100 pursuant to or based on such output information or the wellsite operator 176 may manually control the equipment of the wellsite system 100 pursuant to or based on such output information. For example, the processing device 178 may determine optimal operational parameters of the wellsite equipment for performing the drill-out operations. The processing device 178 may then output the determined optimal operational parameters to the HMI device 177, and thereby display the determined optimal operational parameters on the HMI device 177 for viewing by the wellsite operator 176. The wellsite operator 176 may view the determined optimal operational parameters and make control decisions based on such determined optimal operational parameters. For example, the wellsite operator 176 may operate the wellsite equipment via the control station 175 based on the determined optimal operational parameters to cause the wellsite equipment to perform the drill-out operations at the optimal operational parameters. The wellsite operator 176 may thus visually monitor the current operational performance of the wellsite equipment by viewing the current operational performance data displayed on the HMI device 177. When wellsite operator 176 sees that the current operational performance is different from the optimal operational parameters, the wellsite operator 176 may then adjust the current operational performance of the wellsite equipment via the control station 175 such that the current operational performance of the wellsite equipment matches the optimal operational parameters displayed on the HMI device 177. The optimal operational parameters may comprise operational parameters of the wellsite equipment that minimize time for completing the drill-out operations and/or that minimize cost of the drill-out operations.

The processing device 178 may determine optimal operational parameters of the wellsite equipment based on the current drill-out data, which may comprise or be indicative of current specifications of the wellsite equipment, and based on the historical drill-out data. For example, the optimal operational parameters of the wellsite equipment may be determined based on current specifications of the frac plugs 190 installed within the wellbore 102. The optimal operational parameters of the wellsite equipment may also or instead be determined based on current specifications of the downhole motor 128, the power swivel 134, the drawworks 138, and the fluid pump 154. The optimal operational parameters of the wellsite equipment may also or instead be determined based on current specifications of the well (e.g., the wellbore 102 and/or the casing 103) within which the frac plugs 190 are installed. The current specifications of the well may include, total vertical depth of the wellbore, measured depth of the wellbore, number of frac plugs within the wellbore, dog leg severity of the wellbore, inclination of the wellbore, wellbore path, pressure within the wellbore, and perforation locations along the wellbore, among other examples. The optimal operational parameters of the wellsite equipment may also or instead be determined based on historical specifications of other wellsite equipment used during previously performed drill-out operations at other wellsites and/or historical operational performance data indicative of or comprising historical operational performance of the other wellsite equipment during the previously performed drill-out operations. The historical operational performance data may include measurements of historical weight on bit, historical rotational speed (e.g., RPM) of a power swivel, historical rotational speed of a downhole motor, historical rotational speed of a drill bit, historical surface torque, historical torque at bit (i.e., downhole torque), historical pump rate of drilling fluid, among other examples. The historical specifications may comprise historical specifications of the other wells at the other wellsites and/or historical specifications of other frac plugs installed within the other wells. The historical specifications may further comprise historical specifications of one or more of downhole motors, power swivels, drawworks, and fluid pumps used during previously performed drill-out operations. The optimal operational parameters of the wellsite equipment may also or instead be determined based on historical specifications of other wells within which other frac plugs were installed. The historical specifications of the other wells may include, total vertical depth of other wellbores, measured depths of the other wellbores, number of frac plugs within the other wellbores, dog leg severity of the other wellbores, inclination of the other wellbores, path of the other wellbores, pressure within the other wellbores, and perforation locations along the other wellbores, among other examples. The data system 200 may utilize or comprise aspects of artificial intelligence (AI) (e.g., machine learning or intelligence) to determine the optimal operational parameters based on historical and current drill-out data.

To determine the optimal operational parameters of the wellsite equipment based on the current drill-out data and the historical drill-out data, the data system 200 may be further operable to compare the current specifications to the historical specifications, select one or more of the historical specifications that most closely match corresponding one or more of the current specifications, and select one or more of the historical operational performance data associated with the selected one or more of the historical specifications. To determine optimal operational parameters of the wellsite equipment based on the current specifications and the historical drill-out data, the data system 200 may be further operable to compare the current specifications to the historical specifications, select one or more of the historical specifications that most closely match corresponding one or more of the current specifications, and select one or more of the historical operational performance data associated with the selected one or more of the historical specifications. For example, the data system 200 may be operable to compare the current specifications of the frac plugs 190 currently installed within the wellbore 102 to the historical specifications of the other frac plugs installed within other wells and drilled-out during previously performed drill-out operations. The data system 200 may then select one or more of the historical specifications of the other frac plugs that most closely matches one or more of the current specifications of the frac plugs 190, and then select one or more of the historical operational performance associated with the selected one or more of the historical specifications of the other frac plugs to be or comprise one or more of the optimal operational parameters. Current and historical specifications of the frac plugs may include name of the manufacturer, width, length, weight, material composition, and relative weight or amount of each material, among other examples.

The data system 200 may determine the optimal operational parameters of the wellsite equipment further based on current drill bit specifications and historical drill bit specifications. For example, the data system 200 may be operable to compare the current specifications of the frac plugs 190 and the drill bit 126 to the historical specifications of the other frac plugs and the other drill bits. The data system 200 may then select one or more of the historical specifications of the other frac plugs and the other drill bits that most closely matches one or more of the current specifications of the frac plugs 190 and the drill bit 126, and select one or more of the historical operational performance associated with the selected one or more of the historical specifications of the other frac plugs and the other drill bits to be or comprise one or more of the optimal operational parameters.

The data system 200 may determine the optimal operational parameters of the wellsite equipment further based on current operational performance of the wellsite equipment during the drill-out operations and historical operational performance of other (or the same) wellsite equipment during the previously performed drill-out operations. For example, the data system 200 may be operable to compare the current specifications of the frac plugs 190 to the historical specifications of the other frac plugs, and select one or more of the historical specifications of the other frac plugs that most closely matches one or more of the current specifications of the frac plugs 190. The data system 200 may then compare the current operational performance to the historical operational performance, and select one or more of the historical operational performance that is associated with the selected one or more of the historical specifications of the other frac plugs and most closely matches one or more of the current operational performance to be or comprise one or more of the optimal operational parameters.

The optimal operational parameters of the wellsite equipment may also or instead be determined based on the current operational performance data, including the raw current operational performance data output by sensors of the wellsite equipment and the processed current operational performance data that is calculated or otherwise determined in real-time based on the raw current operational performance data. Therefore, to determine optimal operational parameters of the wellsite equipment based on the current specifications, the historical drill-out data, and the current operational performance data, the data system 200 may be further operable to compare the current specifications to the historical specifications, compare the current operational performance data to the historical operational performance data, select one or more of the historical specifications that most closely match corresponding one or more of the current specifications, and select one or more of the historical operational performance data that is associated with the selected one or more of the historical specifications, and that most closely matches corresponding one or more of the current operational performance data to be or comprise one or more of the optimal operational parameters.

The processed current operational performance data may include, for example, difference between barrels of fluid pumped into the wellbore 102 and the barrels of fluid pumped out of the wellbore 102. During the drill-out operations, the intent is to pump out the same amount of fluid as was pumped in. If less fluid is reaching the surface 104, then the fluid is flowing into and staying within the formation 106. Such effects may damage the formation 106 and are thus unfavorable. Accordingly, the operational parameters of the drill-out operations may have to be changed to achieve equilibrium of inbound and outbound fluid flow rates. The processed current operational performance data may also or instead include difference between weight of a whole frac plug 190 that was set along the wellbore 102 and weight of the plug cuttings that were swept to the surface 104 after being drilled out. If the plug cuttings weigh less than the weight of the whole frac plug 190 that was drilled out, then the frac plugs 190 are not completely drilled out or are flowing into the formation 106. Such effects may impede future production or damage the formation 106 and are thus unfavorable. Accordingly, the operational parameters of the drill-out operations may have to be changed, such that entire frac plugs 190 are drilled out and returned to the surface 104.

The processing device 178 of the data system 200 may be further operable to receive initial operational parameters comprising or indicative of initial maximum and/or minimum values of operational parameters of the wellsite equipment. The initial operational parameters may be displayed to the wellsite operator 176, for example, when the optimal operational parameters are not yet determined by the data system 200 or are otherwise not available. The initial operational parameters may be indicative of upper and lower safety limits, within which safety to the wellsite operator 176 is optimized. The initial operational parameters may be indicative of upper and lower equipment operational limits, within which breakdowns of the wellsite equipment is minimized. The initial operational parameters may be or comprise estimates or calculations of optimal operational parameters determined by the wellsite operator 176 based on experience and/or rules of thumb, such as when the optimal operational parameters are not yet determined by the data system 200 or are otherwise not available. The processing device 178 may display the initial operational parameters and the current operational performance data on the HMI device 177 for viewing by the wellsite operator 176, thereby permitting the wellsite operator 176 to operate the wellsite equipment via the control station 175 to cause the wellsite equipment to perform the drill-out operations such that the current operational performance of the wellsite equipment is at or within the initial operational parameters.

The processing device 178 of the data system 200 may also be communicatively connected with various actuators (e.g., motors, engines, pumps, hydraulic pistons, hydraulic rotary actuators, hydraulic valve actuators (e.g., magnetic coils), etc.) of the wellsite equipment. The processing device 178 may also output control data (i.e., control commands) to the wellsite equipment to automatically control operations of the wellsite equipment to perform the frac plug drill-out operations. The processing device 178 may be communicatively connected with actuators of the rig 112, including the drawworks 138. The processing device 178 may be communicatively connected with actuators of the catwalk 142, the chemical containers 156, 158, the power swivel 134, the drill bit 126, the downhole tools 130, the downhole motor 128, the wellhead 146, the fluid control devices 144, the choke manifold 166, the pump 154, and the fluid containers 150, 152. The processing device 178 may also be communicatively connected with actuators of the PHM 168, the fluid reconditioning equipment 164, the junk catcher or filter 165, the snubbing unit 172, the jointed pipe injector, and the torqueing equipment 174, shown in FIG. 1. The processing device 178 may be communicatively connected with the wellsite equipment directly or via the control station 175. The raw and processed current operational performance data may be utilized in real-time by the processing device 178 as a performance feedback to automatically change operational parameters of the wellsite system 100 to optimize efficiency of the drill-out operations. The control data output by the processing device 178 may cause the wellsite equipment to perform the drill-out operations at the determined optimal operational parameters. The control data may comprise or be indicative of the determined optimal operational parameters, and thus may cause the wellsite equipment to perform the drill-out operations at or pursuant to the determined optimal operational parameters.

The processing device 178 may record the current drill-out data, including the raw current operational performance data and the processed current operational performance data during the drill-out operations, which may then be utilized after the drill-out operations to optimize efficiency of future drill-out operations. Efficiency may be defined, for example, as minimizing cost of the drill-out operations, minimizing the amount of time spent performing the drill-out operations (i.e., the whole frac plug drill-out job), while optimizing safety, minimizing use of chemicals, and minimizing chances of operational breakdowns and other problems (e.g., getting the jointed tubular string 120 stuck within the wellbore 102). This includes minimizing time spent drilling out each frac plug (i.e., time on frac plug), time spent flushing out the frac plug cuttings, and time between each frac plug. The processing device 178 may output end of job reporting, which may include summaries of selected current operational performance data, performance analytics, and efficiency metrics experienced and/or achieved during the frac plug drill-out operations. End of job reporting may also include information relating to fluids and chemicals utilized during the drill-out operations.

The data system 200 may also comprise the processing device 184 and the workstation 182. The processing device 184 may comprise the same structure and operational capabilities as the processing device 178. The processing device 184 may also be communicatively connected with the sensors and actuators of the wellsite equipment. Similarly to the processing device 178, the processing device 184 may be operable to receive the raw and processed current operational performance data from the wellsite equipment, receive current specifications of the wellsite equipment, receive the historical drill-out data, and determine the optimal operational parameters of the wellsite equipment for performing the drill-out operations. The processing device 184 may also display the optimal operational parameters and the raw and processed current operational performance data on the output device 188 for viewing by the operator 185, such as a wellsite supervisor, a company man, or a third party user who is granted access.

The current drill-out data, including the current wellsite specifications and the raw and processed current operational performance data, may be transmitted (e.g., via a wired and/or wireless network) to a database 202 (e.g., a computer, a server, etc.) for recordation in real-time while the current drill-out data is received by the processing device 178. The current drill-out data received by the processing device 178 may also or instead be saved on a removable storage medium (e.g., a flash drive, a floppy disk drive, a hard disk drive, a compact disk (CD), and/or a digital versatile disk (DVD), etc.). The current drill-out data saved on the removable storage medium, which may then be physically transported to a facility housing the database 202 and uploaded or saved to the database 202 at the facility. The database 202 may be an external database 202 located outside of the wellsite 104 and may be accessible via a communication network 204, such as a local area network (LAN), a wide area network (WAN), or the internet. The database 202 may be accessible by the wellsite operator 176 and/or by the operator 185. The database 202 may comprise or contain the historical drill-out data. The current drill-out data from different frac plug drill-out operations may be transmitted to the database 202 for recordation over time as historical (i.e., previously recorded) drill-out data. Thus, when the current drill-out data is recorded in the database, the current drill-out data becomes part of the historical drill-out data that is usable as a basis by the data system 200 to update current optimal operational parameters during the current drill-out operations and determine future optimal operational parameters of still other wellsite equipment for performing future drill-out operations Such historical drill-out data may be used to determine optimal operational parameters for current drill-out operations. For example, after the database 202 of historical drill-out data is compiled, the current drill-out data from current drill-out operations may be compared to the historical drill-out data in real-time during the current drill-out operations to determine (and output) the optimal operational parameters (e.g., performance analytics and efficiency metrics) based on multiple other wells. Thus, the historical drill-out data may be utilized to determine whether the current drill-out operations are performed at optimum efficiency compared to the previously performed drill-out operations. Current operational performance of the wellsite equipment may be changed based on the historical drill-out data in an attempt to improve efficiency of the current drill-out operations. The optimal operational parameters for the current or planned (i.e., future) drill-out operations and/or wellsite equipment utilized to perform such drill-out operations may also or instead be selected based on the historical specifications of the other wells and other wellsite equipment utilized during previously performed drill-out operations in an attempt to improve efficiency of the planned drill-out operations. For example, the physical specifications of a well associated with the current or planned drill-out operations may be compared to historical physical specifications of wells that have previously undergone drill-out operations. If similar wells are found, then a well associated with the most efficient drill-out operations may be analyzed. The wellsite equipment to be used for the planned drill-out operations may selected to be the same as the wellsite equipment used during the most efficient drill-out operations. The optimal operational parameters for the wellsite equipment may be the same or based on the historical drill-out data captured during such most efficient drill-out operations.

Although the database 202 is shown separate and distinct from the center 180, the database 202 may also or instead be located within the center 180. For example, the database 202 may be or form at least a portion of the processing device 184. Thus, the processing device 178 may be communicatively connected with the database 202 via the communication network 204, such as when the center 180 is not located at the wellsite 104. The processing device 178 may be communicatively connected with the database 202 directly via a wired or wireless connection, such as when the center is located at the wellsite 104.

Figure 3:
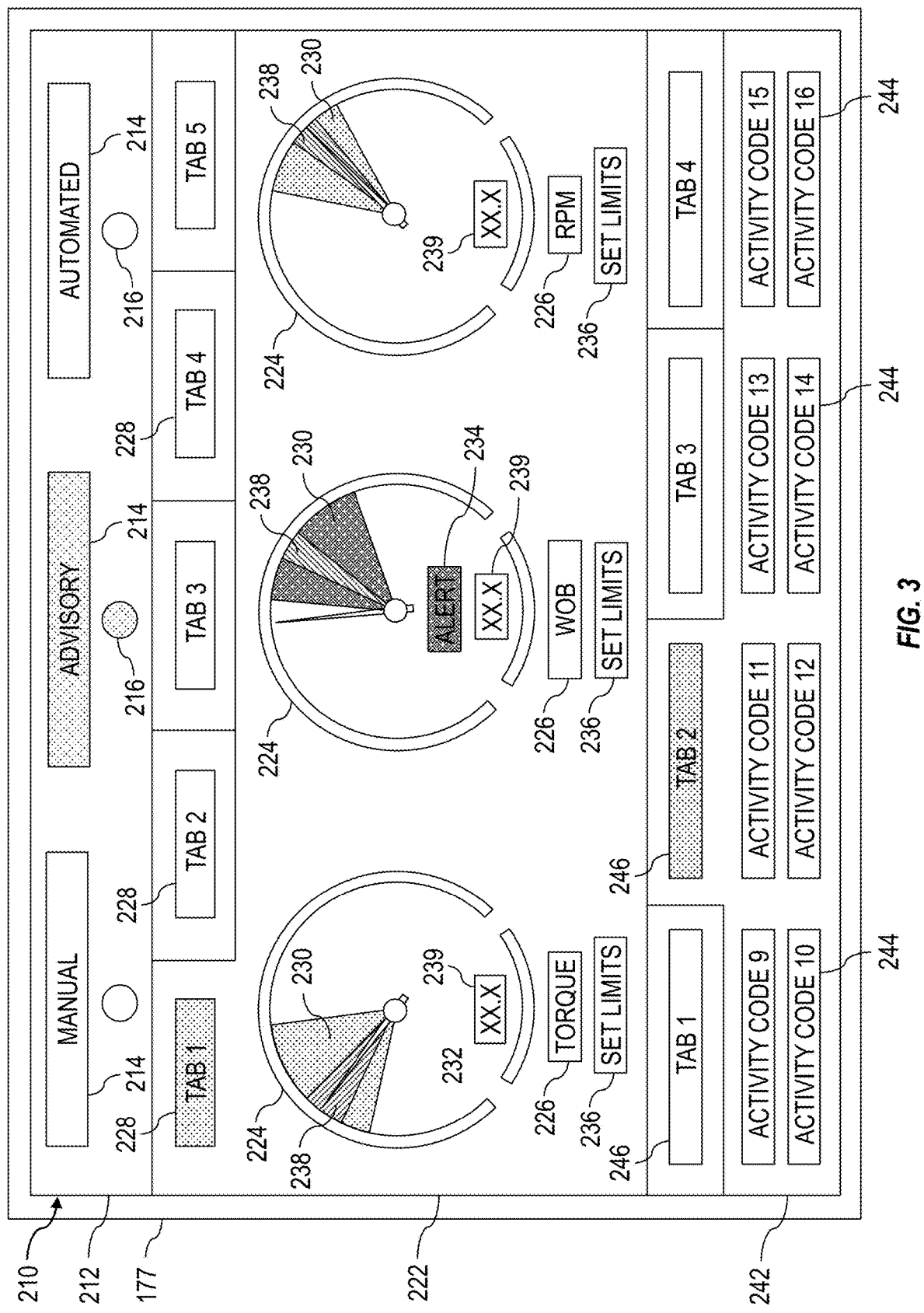
FIG. 3 is an example implementation of a screen displayed by the apparatus shown in FIGS. 1 and 2 according to one or more aspects of the present disclosure.

During frac plug drill-out operations, one or more HMI devices may be usable by the wellsite operator 176 to monitor and control the wellsite equipment of the wellsite system 100. FIG. 3 is an example implementation of a display screen 210 that may be displayed on the HMI device 177 of the data system 200 shown in FIGS. 1 and 2 according to one or more aspects of the present disclosure. The following description refers to FIGS. 1-3, collectively.

The display screen 210 may comprise a control mode selection and confirmation area or window 212, which may be utilized by the wellsite operator 176 to select the mode of operation of the data system 200 and to visually confirm in which mode of operation the data system 200 is operating. For example, the data system 200 may be operated in a manual mode, in which the processing device 178 of the data system 200 receives the current drill-out data, including the raw and processed current operational performance data, and displays such data on the HMI device 177, but does not display the optimal operational parameters determined by the processing device 178 and does not automate or otherwise control the well site equipment. The data system 200 may be further operable in an advisory mode, in which the processing device 178 of the data system 200 receives and displays the current drill-out data on the HMI device 177, and displays the optimal operational parameters determined by the processing device 178 for viewing by the wellsite operator 176, thereby permitting the wellsite operator 176 to cause the wellsite equipment to perform the drill-out operations at the optimal operational parameters. In the advisory mode, the data system 200 does not automate or otherwise control the wellsite equipment. The data system 200 may be operable in an automated mode in which the processing device 178 controls the well site equipment to cause the well site equipment to automatically perform the frac plug drill-out operations at or pursuant to the determined optimal operational parameters.

The window 212 may comprise a plurality of virtual or software controls (e.g., buttons 214), each containing a description (e.g., text, icons, graphics, etc.) of the modes of operation of the data system 200. One of the buttons 214 may be operated (e.g., touched, clicked on, etc.) by the wellsite operator 176 to select the mode of operation the data system 200 is to operate in. The button 214 associated with the selected or otherwise current mode of operation of the data system 200 may appear or become lit, highlighted, or otherwise marked to indicate to the wellsite operator 176 in which mode of operation the data system 200 is operating. The window 212 may further include a plurality of virtual or software indicators 216 (e.g., lights), each associated with a corresponding button 214 listing the modes of operation of the data system 200. One of the indicators 216 may activate (e.g., light up, change color, etc.) to visually confirm or otherwise indicate to the wellsite operator 176 which mode of operation the data system 200 is operating in.

The display screen 210 may further comprise an operational status area or window 222, displaying current operational performance data 224 (e.g., raw or processed current operational performance data) indicative of operational performance of corresponding pieces of the wellsite equipment. The current operational performance data 224 may be displayed in the form of actual numerical values, tables, graphs, bars, gauges, lights, and/or schematics, among other examples. Each current operational performance data 224 may be displayed in association with information 226 (e.g., text) indicative of the source, type, or wellsite equipment associated with the current operational performance data 224. The operational status window 222 may display current operational performance data 224, such as torque (e.g., surface torque or torque at bit), weight on bit (WOB) or hookload, rotating speed (RPM) of the drill bit, travelling block position, roughneck torque, pumped fluid flow rate or volume, return flow rate, drill bit depth, standpipe pressure, and other raw or processed current operational performance data listed herein, among other examples. The information displayed in the operational status window 222 may be changed by operating (e.g., touching, clicking on) one of a plurality of virtual or software controls (e.g., buttons 228) to view a different tab comprising a different set of current operational performance data 224. The current operational performance data 224 may be displayed in association with initial operational parameters, which may be indicated or shown by a range band 230 (indicating an upper and a lower limit) displayed in association with a corresponding operational performance gauge 224. The range band 230 (i.e., the area between the upper and lower operational limits) may be visually enhanced (e.g., highlighted, lit up, differently colored, etc.) to help the wellsite operator 176 to identify whether the wellsite equipment is operating within the initial operational parameters. If operational performance of a piece of wellsite equipment is not within the initial operational parameters, the range band 230 may be further visually enhanced (e.g., flash, changed in colored, etc.) to help the wellsite operator 176 to identify when a piece of wellsite equipment is operating outside of the initial operational parameters. Additional information 234 (e.g., text) may also indicate that the piece of wellsite equipment is not operating within the initial operational parameters. A virtual or software control (e.g., a button 236) associated with each current operational performance data 224 may be operated (e.g., touched, clicked on) by the wellsite operator 176 to set the upper and lower operational limits of the initial operational parameters, such as via a virtual keyboard that appears when one of the buttons 236 is operated. The range band 230 indicative of the initial operational parameters may be displayed when the range band 238 indicative of the optimal operational parameters is not yet displayed because the optimal operational parameters are not yet determined. When the optimal operational parameters are determined, the range band 238 may disappear and the range band 238 may appear, or the range band 230 may narrow and turn into the range band 238.

The current operational performance data 224 may be displayed in association with optimal operational parameters determined by the processing device 178, which may be indicated or shown by a range band 238 (indicating an upper and a lower limit) displayed in association with a corresponding operational performance gauge 224. The optimal operational parameters may also or instead be indicated or shown by a numerical value 239 (or a numerical value range) displayed in association with a corresponding operational performance gauge 224. The range band 238 and/or the numerical value 239 may show to the wellsite operator 176 the optimal operational parameters with respect to the current operational performance of the wellsite equipment, thereby showing the wellsite operator 176 how to control the wellsite equipment to cause the wellsite equipment to perform the drill-out operations at the optimal operational parameters. The range band 238 may be visually enhanced (e.g., highlighted, lit up, differently colored, etc.) to help the wellsite operator 176 to identify the optimal operational parameters with respect to the current operational performance of a corresponding piece of the wellsite equipment. The range band 238 may be further visually enhanced (e.g., flash, changed in colored, etc.) to help the wellsite operator 176 to identify when a piece of wellsite equipment is operating outside of the optimal operational parameters.

The display screen 210 may further comprise an activity selection area or window 242, displaying a plurality of virtual or software controls (e.g., buttons 244), each displayed in association with or containing a description (e.g., a code, an identifier, or another representation) or representation of a corresponding activity performed by one or more pieces of wellsite equipment during the frac plug drill-out operation. Each button 244 may be operated (e.g., touched, clicked on with an input device) by the wellsite operator 176 to select a different activity when such activity commences during the drill-out operations. The buttons 244 and the associated activity descriptions displayed in the activity selection window 242 may be changed by operating (e.g., touching, clicking on) one of a plurality of virtual or software controls (e.g., buttons 246) to view a different tab comprising a different set of buttons 244 and associated activity descriptions. Upon operation of one of the buttons 244, the current operational performance data may be recorded and/or transmitted by the processing device 178 in association with a time stamp and/or the activity description (e.g., activity code) displayed in associated with the operated one of the software buttons 244.

The activity descriptions indicative of activates performed by the wellsite equipment during the drill-out operations and displayed in association with the software buttons 244 may include, for example: rig up equipment; rig up (third party equipment); rig up (snubbing unit); rig down equipment; rig down (third party equipment); rig down (snubbing unit); conventional drilling (down tubular); reverse drilling (down annulus); make up BHA; tag frac plug; no plug; push plug; drilling plug with snubbing; thru plug; condition fluid and circulate; circulate well (surface to surface); circulating while rotating/reciprocating; pump tubular on tubular (lube); pump beads; pump sweep; pump dye; pump friction reducer; RIH; washing down; wash/drill (dissolvable plug); pull out of hole (POOH); run in hole (RIH) with snubbing; POOH with snubbing; lubricate rig; downtime (rig); downtime (posi-stop); downtime (derrick); downtime (drawworks); downtime (rig power—engine/transmission); downtime (pumps); downtime (pump power—engine/transmission); downtime (pipe handler); downtime (power swivel); downtime (other equipment); downtime (instrumentation); downtime (flow back equipment); downtime (mixing plant); downtime (snubbing); downtime (third party equipment); downtime (other); waiting on weather; waiting on orders; replace drill line; wireline operations; nipple up BOP; test BOP; fishing; nipple up Washington head); run spear; and run overshot.

Figure 4:
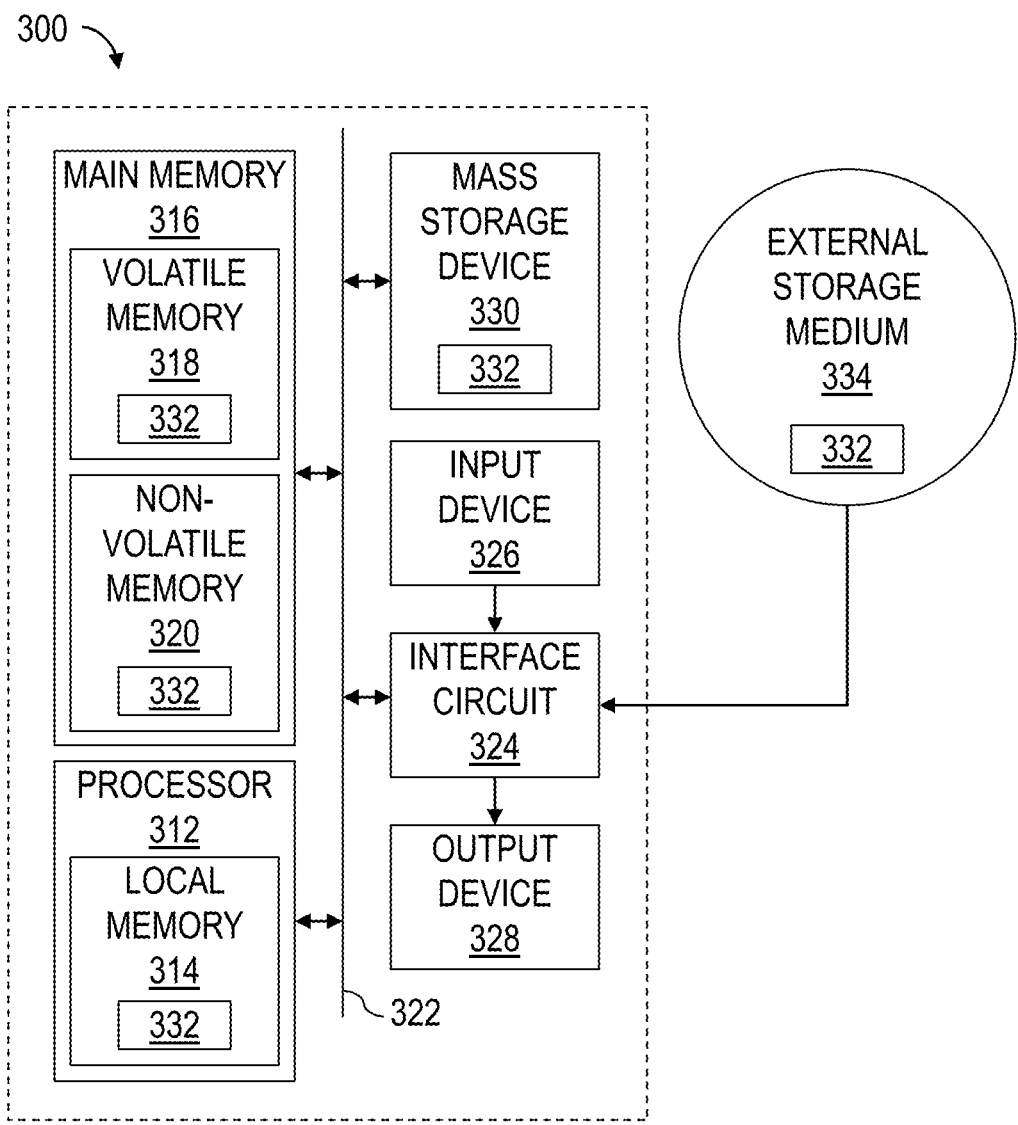
FIG. 4 is a schematic view of at least a portion of an example implementation of apparatus related to one or more aspects of the present disclosure.

FIG. 4 is a schematic view of at least a portion of an example implementation of a processing device 300 (or system) according to one or more aspects of the present disclosure. The processing device 300 may be or form at least a portion of one or more electronic devices shown in one or more of FIGS. 1-3. Accordingly, the following description refers to FIGS. 1-4, collectively.

The processing device 300 may be or comprise, for example, one or more processors, controllers, special-purpose computing devices, PCs (e.g., desktop, laptop, and/or tablet computers), personal digital assistants, smartphones, IPCs, PLCs, servers, internet appliances, and/or other types of computing devices. The processing device 300 may be or form at least a portion of the processing devices 178, 184 utilized as part of wellsite system 100, shown in FIGS. 1 and 2, and the data system 200, shown in FIG. 2. The processing device 300 may be or form at least a portion of the database 202 of the data system 200, shown in FIG. 2. Although it is possible that the entirety of the processing device 300 is implemented within one device, it is also contemplated that one or more components or functions of the processing device 300 may be implemented across multiple devices, some or an entirety of which may be at the wellsite and/or remote from the wellsite.

The processing device 300 may comprise a processor 312, such as a general-purpose programmable processor. The processor 312 may comprise a local memory 314, and may execute machine-readable and executable program code instructions 332 (i.e., computer program code) present in the local memory 314 and/or another memory device. The processor 312 may execute, among other things, the program code instructions 332 and/or other instructions and/or programs to implement the example methods and/or operations described herein. For example, the program code instructions 332, when executed by the processor 312 of the processing device 300, may cause the processor 312 to receive and process (e.g., compare) current operational performance data (e.g., sensor measurements), historical operational performance data, current well and wellsite equipment specifications, and historical well and wellsite equipment specifications, and output optimal performance parameters for display to the wellsite operator or output control data to operate the wellsite equipment at the optimal performance parameters. The program code instructions 332, when executed by the processor 312 of the processing device 300, may also or instead cause one or more portions or pieces of equipment of a wellsite system to perform the example methods and/or operations described herein. The processor 312 may be, comprise, or be implemented by one or more processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, as non-limiting examples. Examples of the processor 312 include one or more INTEL microprocessors, microcontrollers from the ARM, PIC, and/or PICO families of microcontrollers, embedded soft/hard processors in one or more FPGAs.

The processor 312 may be in communication with a main memory 316, such as may include a volatile memory 318 and a non-volatile memory 320, perhaps via a bus 322 and/or other communication means. The volatile memory 318 may be, comprise, or be implemented by random access memory (RAM), static random access memory (SRAM), synchronous dynamic random access memory (SDRAM), dynamic random access memory (DRAM), RAIVIBUS dynamic random access memory (RDRAM), and/or other types of random access memory devices. The non-volatile memory 320 may be, comprise, or be implemented by read-only memory, flash memory, and/or other types of memory devices. One or more memory controllers (not shown) may control access to the volatile memory 318 and/or non-volatile memory 320.

The processing device 300 may also comprise an interface circuit 324, which is in communication with the processor 312, such as via the bus 322. The interface circuit 324 may be, comprise, or be implemented by various types of standard interfaces, such as an Ethernet interface, a universal serial bus (USB), a third generation input/output (3GIO) interface, a wireless interface, a cellular interface, and/or a satellite interface, among others. The interface circuit 324 may comprise a graphics driver card. The interface circuit 324 may comprise a communication device, such as a modem or network interface card to facilitate exchange of data with external computing devices via a network (e.g., Ethernet connection, digital subscriber line (DSL), telephone line, coaxial cable, cellular telephone system, satellite, etc.).

The processing device 300 may be in communication with various sensors, video cameras, actuators, processing devices, equipment controllers, and other devices of the wellsite system via the interface circuit 324. The interface circuit 324 can facilitate communications between the processing device 300 and one or more devices by utilizing one or more communication protocols, such as an Ethernet-based network protocol (such as ProfiNET, OPC, OPC/UA, Modbus TCP/IP, EtherCAT, UDP multicast, Siemens S7 communication, or the like), a proprietary communication protocol, and/or another communication protocol.

One or more input devices 326 may also be connected to the interface circuit 324. The input devices 326 may permit human wellsite operators to enter the program code instructions 332, which may be or comprise control commands, operational parameters, physical properties, and/or operational set-points. The program code instructions 332 may further comprise modeling or predictive routines, equations, algorithms, processes, applications, and/or other programs operable to perform example methods and/or operations described herein. The input devices 326 may be, comprise, or be implemented by a keyboard, a mouse, a joystick, a touchscreen, a track-pad, a trackball, an isopoint, and/or a voice recognition system, among other examples. One or more output devices 328 may also be connected to the interface circuit 324. The output devices 328 may permit for visualization or other sensory perception of various data, such as sensor data, status data, and/or other example data. The output devices 328 may be, comprise, or be implemented by video output devices (e.g., an LCD, an LED display, a CRT display, a touchscreen, etc.), printers, and/or speakers, among other examples. The one or more input devices 326 and the one or more output devices 328 connected to the interface circuit 324 may, at least in part, facilitate the HMI devices described herein.

The processing device 300 may comprise a mass storage device 330 for storing data and program code instructions 332. The mass storage device 330 may be connected to the processor 312, such as via the bus 322. The mass storage device 330 may be or comprise a tangible, non-transitory storage medium, such as a floppy disk drive, a hard disk drive, a compact disk (CD) drive, and/or digital versatile disk (DVD) drive, among other examples. The processing device 300 may be communicatively connected with an external storage medium 334 via the interface circuit 324. The external storage medium 334 may be or comprise a removable storage medium (e.g., a CD or DVD), such as may be operable to store data and program code instructions 332.

As described above, the program code instructions 332 may be stored in the mass storage device 330, the main memory 316, the local memory 314, and/or the removable storage medium 334. Thus, the processing device 300 may be implemented in accordance with hardware (perhaps implemented in one or more chips including an integrated circuit, such as an ASIC), or may be implemented as software or firmware for execution by the processor 312. In the case of firmware or software, the implementation may be provided as a computer program product including a non-transitory, computer-readable medium or storage structure embodying computer program code instructions 332 (i.e., software or firmware) thereon for execution by the processor 312. The program code instructions 332 may include program instructions or computer program code that, when executed by the processor 312, may perform and/or cause performance of example methods, processes, and/or operations described herein.

The present disclosure is further directed to example methods (e.g., operations, processes, actions) for operating or commencing operation of a data system 200 communicatively connected with wellsite equipment for performing drill-out operations of frac plugs installed within a well, as described herein according to one or more aspects of the present disclosure. The example methods may be performed utilizing or otherwise in conjunction with at least a portion of one or more implementations of one or more instances of the apparatus shown in one or more of FIGS. 1-4, and/or otherwise within the scope of the present disclosure. For example, the methods may be performed and/or caused, at least partially, by a processing device, such as the processing device 300 executing program code instructions 332 according to one or more aspects of the present disclosure. Thus, the present disclosure is also directed to a non-transitory, computer-readable medium comprising computer program code or instructions that, when executed by the processing device 300 of a data system 200 communicatively connected with wellsite equipment for performing drill-out operations of frac plugs installed within a well, may cause such processing device 300 to perform the example methods described herein. The methods may also or instead be performed and/or caused, at least partially, by rig personnel utilizing one or more instances of the apparatus shown in one or more of FIGS. 1-4, and/or otherwise within the scope of the present disclosure. However, the methods may also be performed in conjunction with implementations of apparatus other than those depicted in FIGS. 1-4 that are also within the scope of the present disclosure.

In view of the entirety of the present disclosure, including the figures and the claims, a person having ordinary skill in the art will readily recognize that the present disclosure introduces an apparatus comprising a data system configured to be communicatively connected with wellsite equipment for performing drill-out operations of frac plugs installed within a well, wherein the data system comprises a processor and a memory storing computer program code, and wherein the data system is operable to: (A) receive current drill-out data comprising current specifications of the frac plugs installed within the well; (B) receive historical drill-out data comprising: (i) historical specifications of other frac plugs installed within other wells; and (ii) historical operational performance of other wellsite equipment during previously performed drill-out operations of the other frac plugs within the other wells; (C) determine optimal operational parameters of the wellsite equipment for performing the drill-out operations based on the current drill-out data and the historical drill-out data; and (D) display the determined optimal operational parameters on an output device for viewing by the human operator, thereby permitting the human operator to cause the wellsite equipment to perform the drill-out operations at the optimal operational parameters.

The historical operational performance may comprise historical measurements of at least one of surface torque, downhole torque, power swivel rotational speed, downhole motor rotational speed, drill bit rotational speed, and weight on bit.

The optimal operational parameters may comprise operational parameters of the wellsite equipment that minimize: time for completing the drill-out operations; and/or cost of the drill-out operations.

The current drill-out data may comprise current specifications of the wellsite equipment for performing the drill-out operations, and the historical drill-out data may comprise historical specifications of the other wellsite equipment that performed the previously performed drill-out operations.

The wellsite equipment for performing the drill-out operations may comprise at least one of a drill bit, a downhole motor, a power swivel, a drawworks, and a fluid pump, and the other wellsite equipment that performed the previously performed drill-out operations may comprise at least one of another drill bit, another downhole motor, another power swivel, another drawworks, and another fluid pump.

The current drill-out data may comprise current specifications of the well within which the frac plugs are installed, and the historical drill-out data may comprise historical specifications of the other wells within which the other frac plugs were installed.

To determine optimal operational parameters of the wellsite equipment based on the current drill-out data and the historical drill-out data, the data system may be further operable to: compare the current specifications of the frac plugs to the historical specifications of the other frac plugs; select one or more of the historical specifications of the other frac plugs that most closely match one or more of the current specifications of the frac plugs; and select the historical operational performance that is associated with the selected one or more of the historical specifications of the other frac plugs to be, form, or comprise one or more of the optimal operational parameters.

The current drill-out data may comprise current specifications of a drill bit for performing the drill-out operations, and the historical drill-out data may comprise historical specifications of other drill bits that performed the previously performed drill-out operations. In such implementations, among others within the scope of the present disclosure, to determine optimal operational parameters of the wellsite equipment based on the current drill-out data and the historical drill-out data, the data system may be further operable to: compare the current specifications of the frac plugs and the drill bit to the historical specifications of the other frac plugs and the other drill bits; select one or more of the historical specifications of the other frac plugs and the other drill bits that most closely match one or more of the current specifications of the frac plugs and the drill bit; and select the historical operational performance that is associated with the selected one or more of the historical specifications of the other frac plugs and the other drill bits to be, form, or comprise one or more of the optimal operational parameters.

The current drill-out data may comprise current operational performance of the wellsite equipment during the drill-out operations, the current operational performance may comprise current measurements of at least one of surface torque, downhole torque, power swivel rotational speed, downhole motor rotational speed, drill bit rotational speed, and weight on bit, and the historical operational performance may comprise historical measurements of at least one of surface torque, downhole torque, power swivel rotational speed, downhole motor rotational speed, drill bit rotational speed, and weight on bit. In such implementations, among others within the scope of the present disclosure, to determine optimal operational parameters of the wellsite equipment based on the current drill-out data and the historical drill-out data, the data system may be further operable to: compare the current specifications of the frac plugs to the historical specifications of the other frac plugs; select one or more of the historical specifications of the other frac plugs that most closely match one or more of the current specifications of the frac plugs; compare the current operational performance to the historical operational performance; and select the historical operational performance that is associated with the selected one or more of the historical specifications of the other frac plugs and most closely match the current operational performance to be, form, or comprise one or more of the optimal operational parameters.

The current drill-out data may comprise current operational performance of the wellsite equipment during the drill-out operations, and the data system may be further operable to record the current drill-out data to a database containing the historical drill-out data, whereby the current drill-out data becomes part of the historical drill-out data usable as a basis by the data system to determine future optimal operational parameters of still other wellsite equipment for performing future drill-out operations.

The current drill-out data may comprise current operational performance of the wellsite equipment during the drill-out operations, and the data system may be further operable to display the current operational performance on the output device for viewing by the human operator, thereby permitting the human operator to: visually monitor the current operational performance; and when the current operational performance is different from the optimal operational parameters, adjust the current operational performance to match the optimal operational parameters.

The data system may be further operable to: receive initial operational parameters of the wellsite equipment for performing the drill-out operations; and, before the optimal operational parameters are determined and displayed, display the initial operational parameters on the output device for viewing by the human operator, thereby permitting the human operator to cause the wellsite equipment to perform the drill-out operations at the initial operating parameters.

The processor may be an onsite processor located at a wellsite comprising the well, the memory may be an onsite memory located at the wellsite, the onsite processor and the onsite memory may collectively form a portion of an onsite computer, the data system may further comprise an offsite computer not located at the wellsite, and the onsite computer may be operable to receive the historical drill-out data from the offsite computer.

The data system may be further operable to: display on the output device a plurality of software controls, each displayed in association with an activity code representing a corresponding activity performed by the wellsite equipment during the drill-out operations, wherein each software control is selectable by the human operator; record current operational performance data indicative of current operational performance of the wellsite equipment during the drill-out operations; and upon operation of one of the software controls, record the current operational performance data in association with a time stamp and the activity code displayed in associated with the operated one of the software controls.

The wellsite equipment may comprise: a pump operable to pump a fluid into the wellbore to flush out frac plug cuttings during the drill-out operations; and a rig operable to connect a plurality of jointed tubulars and a drill bit to assemble a jointed tubular string for drilling out the frac plugs installed within the well during the drill-out operations, wherein the rig may be configured to be transported to the wellsite via roadways and assembled at the wellsite. When assembled at the wellsite, the rig may comprise a mast, a power swivel carried by the mast, and a drawworks.

The present disclosure also introduces a computer program product comprising a non-transitory, computer-readable medium comprising computer instructions executable by a processor of a data system communicatively connected with wellsite equipment for performing drill-out operations of frac plugs installed within a well, wherein the computer instructions, when executed by the processor of the data system, cause the data system to: (A) receive current drill-out data comprising current specifications of the frac plugs installed within the well; (B) receive historical drill-out data comprising: (i) historical specifications of other frac plugs installed within other wells; and (ii) historical operational performance of other wellsite equipment during previously performed drill-out operations of the other frac plugs within the other wells; (C) determine optimal operational parameters of the wellsite equipment for performing the drill-out operations based on the current drill-out data and the historical drill-out data; and (D) display the determined optimal operational parameters on an output device for viewing by the human operator, thereby permitting the human operator to cause the wellsite equipment to perform the drill-out operations at the optimal operational parameters.

The current drill-out data may comprise current specifications of the wellsite equipment for performing the drill-out operations, and the historical drill-out data may comprise historical specifications of the other wellsite equipment that performed the previously performed drill-out operations.

The wellsite equipment for performing the drill-out operations may comprise at least one of a drill bit, a downhole motor, a power swivel, a drawworks, and a fluid pump, and the other wellsite equipment that performed the previously performed drill-out operations may comprise at least one of another drill bit, another downhole motor, another power swivel, another drawworks, and another fluid pump.

To determine optimal operational parameters of the wellsite equipment based on the current drill-out data and the historical drill-out data, the computer instructions may further cause the data system to: compare the current specifications of the frac plugs to the historical specifications of the other frac plugs; select one or more of the historical specifications of the other frac plugs that most closely match one or more of the current specifications of the frac plugs; and select the historical operational performance that is associated with the selected one or more of the historical specifications of the other frac plugs to be, form, or comprise one or more of the optimal operational parameters.

The current drill-out data may comprise current specifications of a drill bit for performing the drill-out operations, and the historical drill-out data may comprise historical specifications of other drill bits that performed the previously performed drill-out operations. In such implementations, among others within the scope of the present disclosure, to determine optimal operational parameters of the wellsite equipment based on the current drill-out data and the historical drill-out data, the computer instructions may further cause the data system to: compare the current specifications of the frac plugs and the drill bit to the historical specifications of the other frac plugs and the other drill bits; select one or more of the historical specifications of the other frac plugs and the other drill bits that most closely match one or more of the current specifications of the frac plugs and the drill bit; and select the historical operational performance that is associated with the selected one or more of the historical specifications of the other frac plugs and the other drill bits to be, form, or comprise one or more of the optimal operational parameters.

The current drill-out data may comprise current operational performance of the wellsite equipment during the drill-out operations, the current operational performance may comprise current measurements of at least one of surface torque, downhole torque, power swivel rotational speed, downhole motor rotational speed, drill bit rotational speed, and weight on bit, and the historical operational performance may comprise historical measurements of at least one of surface torque, downhole torque, power swivel rotational speed, downhole motor rotational speed, drill bit rotational speed, and weight on bit. In such implementations, among others within the scope of the present disclosure, to determine optimal operational parameters of the wellsite equipment based on the current drill-out data and the historical drill-out data, the computer instructions may further cause the data system to: compare the current specifications of the frac plugs to the historical specifications of the other frac plugs; select one or more of the historical specifications of the other frac plugs that most closely match one or more of the current specifications of the frac plugs; compare the current operational performance to the historical operational performance; and select the historical operational performance that is associated with the selected one or more of the historical specifications of the other frac plugs and most closely match one or more of the current operational performance to be, form, or comprise one or more of the optimal operational parameters.

The current drill-out data may comprise current operational performance of the wellsite equipment during the drill-out operations, and the computer instructions may further cause the data system to display the current operational performance on the output device for viewing by the human operator, thereby permitting the human operator to: visually monitor the current operational performance; and adjust the current operational performance to match the optimal operational parameters.

The present disclosure also introduces a method comprising commencing operation of a data system communicatively connected with wellsite equipment for performing drill-out operations of frac plugs installed within a well, wherein commencing operation of the data system causes the data system to: (A) receive current drill-out data comprising current specifications of the frac plugs installed within the well; (B) receive historical drill-out data comprising: (i) historical specifications of other frac plugs installed within other wells; and (ii) historical operational performance of other wellsite equipment during previously performed drill-out operations of the other frac plugs within the other wells; (C) determine optimal operational parameters of the wellsite equipment for performing the drill-out operations based on the current drill-out data and the historical drill-out data; and (D) display the determined optimal operational parameters on an output device for viewing by the human operator, thereby permitting the human operator to cause the wellsite equipment to perform the drill-out operations at the optimal operational parameters.

The historical operational performance may comprise historical measurements of at least one of surface torque, downhole torque, power swivel rotational speed, downhole motor rotational speed, drill bit rotational speed, and weight on bit.

The current drill-out data may comprise current specifications of the wellsite equipment for performing the drill-out operations, and the historical drill-out data may comprise historical specifications of the other wellsite equipment that performed the previously performed drill-out operations.

The wellsite equipment for performing the drill-out operations may comprise at least one of a drill bit, a downhole motor, a power swivel, a drawworks, and a fluid pump, and the other wellsite equipment that performed the previously performed drill-out operations may comprise at least one of another drill bit, another downhole motor, another power swivel, another drawworks, and another fluid pump.

To determine optimal operational parameters of the wellsite equipment based on the current drill-out data and the historical drill-out data, commencing operation of the data system may further cause the data system to: compare the current specifications of the frac plugs to the historical specifications of the other frac plugs; select one or more of the historical specifications of the other frac plugs that most closely match one or more of the current specifications of the frac plugs; and select the historical operational performance that is associated with the selected one or more of the historical specifications of the other frac plugs to be, form, or comprise one or more of the optimal operational parameters.

The current drill-out data may comprise current operational performance of the wellsite equipment during the drill-out operations, and commencing operation of the data system may further cause the data system to record the current drill-out data to a database containing the historical drill-out data, whereby the current drill-out data becomes part of the historical drill-out data usable as a basis by the data system to determine future optimal operational parameters of still other wellsite equipment for performing future drill-out operations.

The current drill-out data may comprise current operational performance of the wellsite equipment during the drill-out operations, and commencing operation of the data system may further cause the data system to display the current operational performance on the output device for viewing by the human operator, thereby permitting the human operator to: visually monitor the current operational performance; and adjust the current operational performance to match the optimal operational parameters.

Commencing operation of the data system may further cause the data system to: display on the output device a plurality of software controls, each displayed in association with an activity code representing a corresponding activity performed by the wellsite equipment during the drill-out operations, wherein each software control is selectable by the human operator; record current operational performance data indicative of current operational performance of the wellsite equipment during the drill-out operations; and upon operation of one of the software controls, record the current operational performance data in association with a time stamp and the activity code displayed in associated with the operated one of the software controls.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the scope of the present disclosure, and that they may make various changes, substitutions and alterations herein without departing from the spirit and scope of the present disclosure.

What is claimed is:

1. An apparatus comprising:
a data system configured to be communicatively connected with wellsite equipment for performing drill-out operations of frac plugs installed within a well, wherein the data system comprises a processor and a memory storing computer program code, and wherein the data system is operable to:
receive current drill-out data comprising current specifications of the frac plugs installed within the well;
receive historical drill-out data comprising:
historical specifications of other frac plugs installed within other wells; and
historical operational performance of other wellsite equipment during previously performed drill-out operations of the other frac plugs within the other wells;
determine optimal operational parameters of the wellsite equipment for performing the drill-out operations based on the current drill-out data and the historical drill-out data; and
cause the wellsite equipment to perform the drill-out operations at the optimal operational parameters.

2. The apparatus of claim 1 wherein the historical operational performance comprises historical measurements of at least one of surface torque, downhole torque, power swivel rotational speed, downhole motor rotational speed, drill bit rotational speed, and weight on bit.

3. The apparatus of claim 1 wherein the optimal operational parameters comprise operational parameters of the wellsite equipment that minimize:
time for completing the drill-out operations; and/or
cost of the drill-out operations.

4. The apparatus of claim 1 wherein:
the current drill-out data further comprises current specifications of the wellsite equipment for performing the drill-out operations; and
the historical drill-out data further comprises historical specifications of the other wellsite equipment that performed the previously performed drill-out operations.

5. The apparatus of claim 1 wherein:
the wellsite equipment for performing the drill-out operations comprises at least one of a drill bit, a downhole motor, a power swivel, a drawworks, and a fluid pump; and
the other wellsite equipment that performed the previously performed drill-out operations comprises at least one of another drill bit, another downhole motor, another power swivel, another drawworks, and another fluid pump.

6. The apparatus of claim 1 wherein:
the current drill-out data further comprises current specifications of the well within which the frac plugs are installed; and
the historical drill-out data further comprises historical specifications of the other wells within which the other frac plugs were installed.

7. The apparatus of claim 1 wherein, to determine optimal operational parameters of the wellsite equipment based on the current drill-out data and the historical drill-out data, the data system is further operable to:
compare the current specifications of the frac plugs to the historical specifications of the other frac plugs;
select one or more of the historical specifications of the other frac plugs that most closely match one or more of the current specifications of the frac plugs; and
select the historical operational performance that is associated with the selected one or more of the historical specifications of the other frac plugs to be, form, or comprise one or more of the optimal operational parameters.

8. The apparatus of claim 1 wherein:
the current drill-out data further comprises current specifications of a drill bit for performing the drill-out operations;
the historical drill-out data further comprises historical specifications of other drill bits that performed the previously performed drill-out operations; and
to determine optimal operational parameters of the wellsite equipment based on the current drill-out data and the historical drill-out data, the data system is further operable to:
compare the current specifications of the frac plugs and the drill bit to the historical specifications of the other frac plugs and the other drill bits;
select one or more of the historical specifications of the other frac plugs and the other drill bits that most closely match one or more of the current specifications of the frac plugs and the drill bit; and
select the historical operational performance that is associated with the selected one or more of the historical specifications of the other frac plugs and the other drill bits to be, form, or comprise one or more of the optimal operational parameters.

9. The apparatus of claim 1 wherein:
the current drill-out data further comprises current operational performance of the wellsite equipment during the drill-out operations;
the current operational performance comprises current measurements of at least one of surface torque, downhole torque, power swivel rotational speed, downhole motor rotational speed, drill bit rotational speed, and weight on bit;
the historical operational performance comprises historical measurements of at least one of surface torque, downhole torque, power swivel rotational speed, downhole motor rotational speed, drill bit rotational speed, and weight on bit; and
to determine optimal operational parameters of the wellsite equipment based on the current drill-out data and the historical drill-out data, the data system is further operable to:
compare the current specifications of the frac plugs to the historical specifications of the other frac plugs;
select one or more of the historical specifications of the other frac plugs that most closely match one or more of the current specifications of the frac plugs;
compare the current operational performance to the historical operational performance; and
select the historical operational performance that is associated with the selected one or more of the historical specifications of the other frac plugs and most closely match the current operational performance to be, form, or comprise one or more of the optimal operational parameters.

10. The apparatus of claim 1 wherein:
the current drill-out data further comprises current operational performance of the wellsite equipment during the drill-out operations; and
the data system is further operable to record the current drill-out data to a database containing the historical drill-out data, whereby the current drill-out data becomes part of the historical drill-out data usable as a basis by the data system to determine future optimal operational parameters of still other wellsite equipment for performing future drill-out operations.

11. The apparatus of claim 1 wherein:
the current drill-out data further comprises current operational performance of the wellsite equipment during the drill-out operations; and
the data system is further operable to display the current operational performance on the output device for viewing by a human operator, thereby permitting the human operator to:
visually monitor the current operational performance; and
when the current operational performance is different from the optimal operational parameters, adjust the current operational performance to match the optimal operational parameters.

12. The apparatus of claim 1 wherein the data system is further operable to:
receive initial operational parameters of the wellsite equipment for performing the drill-out operations; and
before the optimal operational parameters are determined and displayed, display the initial operational parameters on the output device for viewing by a human operator, thereby permitting the human operator to cause the wellsite equipment to perform the drill-out operations at the initial operating parameters.

13. The apparatus of claim 1 wherein:
the processor is an onsite processor located at a wellsite comprising the well;
the memory is an onsite memory located at the wellsite;
the onsite processor and the onsite memory collectively form a portion of an onsite computer;
the data system further comprises an offsite computer not located at the wellsite; and
the onsite computer is operable to receive the historical drill-out data from the offsite computer.

14. The apparatus of claim 1 wherein the data system is further operable to:
display on the output device a plurality of software controls for viewing by a human operator, each displayed in association with an activity code representing a corresponding activity performed by the wellsite equipment during the drill-out operations, wherein each software control is operable by the human operator;
record current operational performance data indicative of current operational performance of the wellsite equipment during the drill-out operations; and
upon operation of one of the software controls by the human operator, record the current operational performance data in association with a time stamp and the activity code displayed in association with the operated one of the software controls.

15. The apparatus of claim 1 wherein the wellsite equipment comprises:
a pump operable to pump a fluid into the wellbore to flush out frac plug cuttings during the drill-out operations; and
a rig operable to connect a plurality of jointed tubulars and a drill bit to assemble a jointed tubular string for drilling out the frac plugs installed within the well during the drill-out operations, wherein the rig is configured to be transported to the wellsite via roadways and assembled at the wellsite, and wherein, when assembled at the wellsite, the rig comprises:
a mast;
a power swivel carried by the mast; and
a drawworks.

16. The apparatus of claim 1 wherein:
the historical operational performance comprises historical measurements of surface torque, downhole torque, power swivel rotational speed, drill bit rotational speed, and weight on bit;
the optimal operational parameters comprise operational parameters of the wellsite equipment that minimize time and cost of completing the drill-out operations;
the wellsite equipment for performing the drill-out operations comprises: a drill bit, a power swivel, a drawworks, a fluid pump operable to pump a fluid into the wellbore to flush out frac plug cuttings during the drill-out operations, and a rig operable to connect a plurality of jointed tubulars and the drill bit to assemble a jointed tubular string for drilling out the frac plugs installed within the well during the drill-out operations, the rig being configured to be transported to the wellsite via roadways and assembled at the wellsite and comprising a mast, a power swivel carried by the mast, and the drawworks;
the other wellsite equipment that performed the previously performed drill-out operations comprises: other drill bits, other power swivels, other drawworks, and other fluid pumps;
the current drill-out data further comprises:
current specifications of the wellsite equipment for performing the drill-out operations;
current specifications of the well within which the frac plugs are installed;
current specifications of the drill bit for performing the drill-out operations; and
current operational performance of the wellsite equipment during the drill-out operations, including current measurements of at least one of surface torque, downhole torque, power swivel rotational speed, drill bit rotational speed, and weight on bit;
the historical drill-out data further comprises historical specifications of:
the other wellsite equipment that performed the previously performed drill-out operations;
the other wells within which the other frac plugs were installed; and
the other drill bits that performed the previously performed drill-out operations;
to determine optimal operational parameters of the wellsite equipment based on the current drill-out data and the historical drill-out data, the data system is further operable to:
compare the current specifications of the frac plugs and the drill bit to the historical specifications of the other frac plugs and the other drill bits;
select one or more of the historical specifications of the other frac plugs and the other drill bits that most closely match one or more of the current specifications of the frac plugs and the drill bit; and
select the historical operational performance that is associated with the selected one or more of the historical specifications of the other frac plugs and the other drill bits to be, form, or comprise one or more of the optimal operational parameters;
the data system is further operable to:
record the current drill-out data to a database containing the historical drill-out data, whereby the current drill-out data becomes part of the historical drill-out data usable as a basis by the data system to determine future optimal operational parameters of still other wellsite equipment for performing future drill-out operations;

display the current operational performance on the output device for viewing by a human operator, thereby permitting the human operator to:
  visually monitor the current operational performance; and
  when the current operational performance is different from the optimal operational parameters, adjust the current operational performance to match the optimal operational parameters;
receive initial operational parameters of the wellsite equipment for performing the drill-out operations;
before the optimal operational parameters are determined and displayed, display the initial operational parameters on the output device for viewing by the human operator, thereby permitting the human operator to cause the wellsite equipment to perform the drill-out operations at the initial operating parameters;
display on the output device a plurality of software controls for viewing by the human operator, each displayed in association with an activity code representing a corresponding activity performed by the wellsite equipment during the drill-out operations, wherein each software control is operable by the human operator;
record current operational performance data indicative of current operational performance of the wellsite equipment during the drill-out operations; and
upon operation of one of the software controls by the human operator, record the current operational performance data in association with a time stamp and the activity code displayed in association with the operated one of the software controls;
the processor is an onsite processor located at a wellsite comprising the well;
the memory is an onsite memory located at the wellsite;
the onsite processor and the onsite memory collectively form a portion of an onsite computer;
the data system further comprises an offsite computer not located at the wellsite; and
the onsite computer is operable to receive the historical drill-out data from the offsite computer.

17. A computer program product comprising:
a non-transitory, computer-readable medium comprising computer instructions executable by a processor of a data system communicatively connected with wellsite equipment for performing drill-out operations of frac plugs installed within a well, wherein the computer instructions, when executed by the processor of the data system, cause the data system to:
  receive current drill-out data comprising current specifications of the frac plugs installed within the well;
  receive historical drill-out data comprising:
    historical specifications of other frac plugs installed within other wells; and
    historical operational performance of other wellsite equipment during previously performed drill-out operations of the other frac plugs within the other wells;
  determine optimal operational parameters of the wellsite equipment for performing the drill-out operations based on the current drill-out data and the historical drill-out data; and
  cause the wellsite equipment to perform the drill-out operations at the optimal operational parameters.

18. The computer program product of claim 17 wherein:
the current drill-out data further comprises current specifications of the wellsite equipment for performing the drill-out operations; and
the historical drill-out data further comprises historical specifications of the other wellsite equipment that performed the previously performed drill-out operations.

19. The computer program product of claim 17 wherein:
the wellsite equipment for performing the drill-out operations comprises at least one of a drill bit, a downhole motor, a power swivel, a drawworks, and a fluid pump; and
the other wellsite equipment that performed the previously performed drill-out operations comprises at least one of another drill bit, another downhole motor, another power swivel, another drawworks, and another fluid pump.

20. The computer program product of claim 17 wherein, to determine optimal operational parameters of the wellsite equipment based on the current drill-out data and the historical drill-out data, the computer instructions further cause the data system to:
  compare the current specifications of the frac plugs to the historical specifications of the other frac plugs;
  select one or more of the historical specifications of the other frac plugs that most closely match one or more of the current specifications of the frac plugs; and
  select the historical operational performance that is associated with the selected one or more of the historical specifications of the other frac plugs to be, form, or comprise one or more of the optimal operational parameters.

21. The computer program product of claim 17 wherein:
the current drill-out data further comprises current specifications of a drill bit for performing the drill-out operations;
the historical drill-out data further comprises historical specifications of other drill bits that performed the previously performed drill-out operations; and
to determine optimal operational parameters of the wellsite equipment based on the current drill-out data and the historical drill-out data, the computer instructions further cause the data system to:
  compare the current specifications of the frac plugs and the drill bit to the historical specifications of the other frac plugs and the other drill bits;
  select one or more of the historical specifications of the other frac plugs and the other drill bits that most closely match one or more of the current specifications of the frac plugs and the drill bit; and
  select the historical operational performance that is associated with the selected one or more of the historical specifications of the other frac plugs and the other drill bits to be, form, or comprise one or more of the optimal operational parameters.

22. The computer program product of claim 17 wherein:
the current drill-out data further comprises current operational performance of the wellsite equipment during the drill-out operations;
the current operational performance comprises current measurements of at least one of surface torque, downhole torque, power swivel rotational speed, downhole motor rotational speed, drill bit rotational speed, and weight on bit;
the historical operational performance comprises historical measurements of at least one of surface torque, downhole torque, power swivel rotational speed, downhole motor rotational speed, drill bit rotational speed, and weight on bit; and to determine optimal operational parameters of the wellsite equipment based on the current drill-out data and the historical drill-out data, the computer instructions further cause the data system to:
- compare the current specifications of the frac plugs to the historical specifications of the other frac plugs;
- select one or more of the historical specifications of the other frac plugs that most closely match one or more of the current specifications of the frac plugs;
- compare the current operational performance to the historical operational performance; and
- select the historical operational performance that is associated with the selected one or more of the historical specifications of the other frac plugs and most closely match one or more of the current operational performance to be, form, or comprise one or more of the optimal operational parameters.

23. The computer program product of claim 17 wherein:
the current drill-out data further comprises current operational performance of the wellsite equipment during the drill-out operations; and
the computer instructions further cause the data system to display the current operational performance on the output device for viewing by a human operator, thereby permitting the human operator to:
- visually monitor the current operational performance; and
- adjust the current operational performance to match the optimal operational parameters.

24. A method comprising:
commencing operation of a data system communicatively connected with wellsite equipment for performing drill-out operations of frac plugs installed within a well, wherein commencing operation of the data system causes the data system to:
- receive current drill-out data comprising current specifications of the frac plugs installed within the well;
- receive historical drill-out data comprising:
  - historical specifications of other frac plugs installed within other wells; and
  - historical operational performance of other wellsite equipment during previously performed drill-out operations of the other frac plugs within the other wells;
- determine optimal operational parameters of the wellsite equipment for performing the drill-out operations based on the current drill-out data and the historical drill-out data; and
- cause the wellsite equipment to perform the drill-out operations at the optimal operational parameters.

25. The method of claim 24 wherein the historical operational performance comprises historical measurements of at least one of surface torque, downhole torque, power swivel rotational speed, downhole motor rotational speed, drill bit rotational speed, and weight on bit.

26. The method of claim 24 wherein:
the current drill-out data further comprises current specifications of the wellsite equipment for performing the drill-out operations; and
the historical drill-out data further comprises historical specifications of the other wellsite equipment that performed the previously performed drill-out operations.

27. The method of claim 24 wherein:
the wellsite equipment for performing the drill-out operations comprises at least one of a drill bit, a downhole motor, a power swivel, a drawworks, and a fluid pump; and
the other wellsite equipment that performed the previously performed drill-out operations comprises at least one of another drill bit, another downhole motor, another power swivel, another drawworks, and another fluid pump.

28. The method of claim 24 wherein, to determine optimal operational parameters of the wellsite equipment based on the current drill-out data and the historical drill-out data, commencing operation of the data system further causes the data system to:
- compare the current specifications of the frac plugs to the historical specifications of the other frac plugs;
- select one or more of the historical specifications of the other frac plugs that most closely match one or more of the current specifications of the frac plugs; and
- select the historical operational performance that is associated with the selected one or more of the historical specifications of the other frac plugs to be, form, or comprise one or more of the optimal operational parameters.

29. The method of claim 24 wherein:
the current drill-out data further comprises current operational performance of the wellsite equipment during the drill-out operations; and
commencing operation of the data system further causes the data system to record the current drill-out data to a database containing the historical drill-out data, whereby the current drill-out data becomes part of the historical drill-out data usable as a basis by the data system to determine future optimal operational parameters of still other wellsite equipment for performing future drill-out operations.

30. The method of claim 24 wherein:
the current drill-out data further comprises current operational performance of the wellsite equipment during the drill-out operations; and
commencing operation of the data system further causes the data system to display the current operational performance on the output device for viewing by a human operator, thereby permitting the human operator to:
- visually monitor the current operational performance; and
- adjust the current operational performance to match the optimal operational parameters.

31. The method of claim 24 wherein commencing operation of the data system further causes the data system to:
- display on the output device a plurality of software controls for viewing by a human operator, each displayed in association with an activity code representing a corresponding activity performed by the wellsite equipment during the drill-out operations, wherein each software control is selectable operable by the a human operator;
- record current operational performance data indicative of current operational performance of the wellsite equipment during the drill-out operations; and
- upon operation of one of the software controls by the human operator, record the current operational performance data in association with a time stamp and the activity code displayed in association with the operated one of the software controls.

* * * * *